(12) United States Patent
Tachibana

(10) Patent No.: US 8,963,005 B2
(45) Date of Patent: Feb. 24, 2015

(54) BUS BAR MODULE

(75) Inventor: Hideaki Tachibana, Anjo (JP)

(73) Assignee: Denso Corporation, Kariya (JP)

( * ) Notice: Subject to any disclaimer, the term of this patent is extended or adjusted under 35 U.S.C. 154(b) by 842 days.

(21) Appl. No.: 13/177,046

(22) Filed: Jul. 6, 2011

(65) Prior Publication Data

US 2012/0006595 A1  Jan. 12, 2012

(30) Foreign Application Priority Data

Jul. 6, 2010 (JP) ................................ 2010-153716
May 13, 2011 (JP) ................................ 2011-108108

(51) Int. Cl.
*H01R 9/05* (2006.01)
*H02G 15/04* (2006.01)
*H02M 7/00* (2006.01)

(52) U.S. Cl.
CPC ..................................... *H02M 7/003* (2013.01)
USPC .... 174/74 R; 174/72 B; 174/71 B; 174/77 R; 174/88 B; 174/70 B

(58) Field of Classification Search
CPC ... H01L 23/49541; H01L 24/48; H01L 24/49; H01L 24/45; H02J 7/0068; H02J 7/007; H05K 2201/1053; H05K 7/026; H01B 7/0018; H02B 13/01; H02G 3/086; H02G 3/16; H02G 5/005
USPC ........ 174/72 B, 71 B, 74 R, 77 R, 88 B, 70 B
See application file for complete search history.

(56) References Cited

U.S. PATENT DOCUMENTS

2003/0086246 A1* 5/2003 Wakabayashi et al. ....... 361/728
2010/0044066 A1* 2/2010 Shimizu et al. ............... 174/68.2

FOREIGN PATENT DOCUMENTS

JP          2009-65783       3/2009
JP          2010-115060      5/2010
JP          2010115060  A  *  5/2010  .............. H02M 7/48

OTHER PUBLICATIONS

Office Action (2 pages) dated Jan. 22, 2013, issued in corresponding Japanese Application No. 2011-108108 and English translation (3 pages).

* cited by examiner

*Primary Examiner* — Dion R Ferguson
(74) *Attorney, Agent, or Firm* — Nixon & Vanderhye P.C.

(57) ABSTRACT

A bus bar module, which is electrically connected to a power terminal of an at least one semiconductor module having a semiconductor element, includes at least one bus bar made of a conductor, and a sealing member made of resin which seals part of the bus bar. The bus bar has at least one welded plate including an at least one welded part welded to the power terminal, and a held plate held by the sealing member. Part of the held plate configures a sealed part sealed with the sealing member. At least one slit is formed between the welded plate and the held plate. The welded plate and the held plate are connected to each other at a predetermined position farther from the sealed part than from the at least one welded part.

6 Claims, 21 Drawing Sheets

BUS BAR MODULE

CROSS-REFERENCE TO RELATED APPLICATION

This application is based on and claims the benefit of priority from earlier Japanese Patent Applications No. 2010-153716 filed on Jul. 6, 2010, and No. 2011-108108 filed on May 13, 2011, the descriptions of which are incorporated herein by reference.

BACKGROUND

1. Technical Field

The present invention relates to a bus bar module which seals a part of a bus bar with a sealing member made of resin.

2. Related Art

Bus bar modules are known which are electrically connected to semiconductor modules incorporating a semiconductor element. As shown in FIGS. 19 and 20, one of the bus bar modules includes a bus bar 93 made of a metal plate, and a sealing member 910 made of resin which seals a part of the bus bar 93 (refer to JP-A-2009-65783).

Welded parts 940 to be welded to power terminals 920 of the semiconductor modules 92 are formed on the end faces of the bus bar 93. The welded parts 940 are made flush with the end faces of the power terminals 920, and the bus bar 93 and the power terminals 920 are made to overlap each other. Then, TIG welding or the like is performed to weld the bus bar 93 and the power terminals 920 to each other. Thereby, the bus bar 93 and the power terminals 920 are electrically connected to each other.

In addition, a bus bar module 90 has a plurality of bus bars 93, which are not shown. The bus bar module 90 is configured by sealing the plurality of bus bars 93 with the sealing member 910 to integrate the bus bars 93 with each other. A part of the bus bar 93 configures a sealed part 950 sealed by the sealing member 910.

However, in the above bus bar module 90, since the heat-transfer distance from the welded part 940 to the sealed part 950 is relatively short, heat generated on welding is easily transferred from the welded part 940 to the sealed part 950. As a result, the sealing member 910 easily melts.

To solve this problem, as shown in FIG. 21, a configuration is proposed in which a notch 99 is provided between the welded part 940 and the sealed part 950. According to this configuration, the strength of the bus bar 93 decreases at the portion where the notch 99 is formed.

SUMMARY

An embodiment provides a bus bar module in which a sealing member is not easily melted by the heat generated when welding a bus bar.

As an aspect of the embodiment, the bus bar module, which is electrically connected to a power terminal of an at least one semiconductor module including a semiconductor element, includes: at least one bus bar made of a conductor; and a sealing member made of resin which seals part of the bus bar, wherein the bus bar has at least one welded plate including an at least one welded part welded to the power terminal, and a held plate held by the sealing member, part of the held plate configures a sealed part sealed with the sealing member, at least one slit is formed between the welded plate and the held plate, and the welded plate and the held plate are connected to each other at a predetermined position farther from the sealed part than from the at least one welded part.

DETAILED DESCRIPTION OF THE PREFERRED EMBODIMENTS

With reference to the accompanying drawings, hereinafter are described embodiments. Throughout the drawings, components identical with or similar to each other are given the same numerals for the sake of omitting unnecessary explanation.

First Embodiment

A bus bar module according to an embodiment will be explained with reference to FIGS. 1 to 9.

Figure 4:
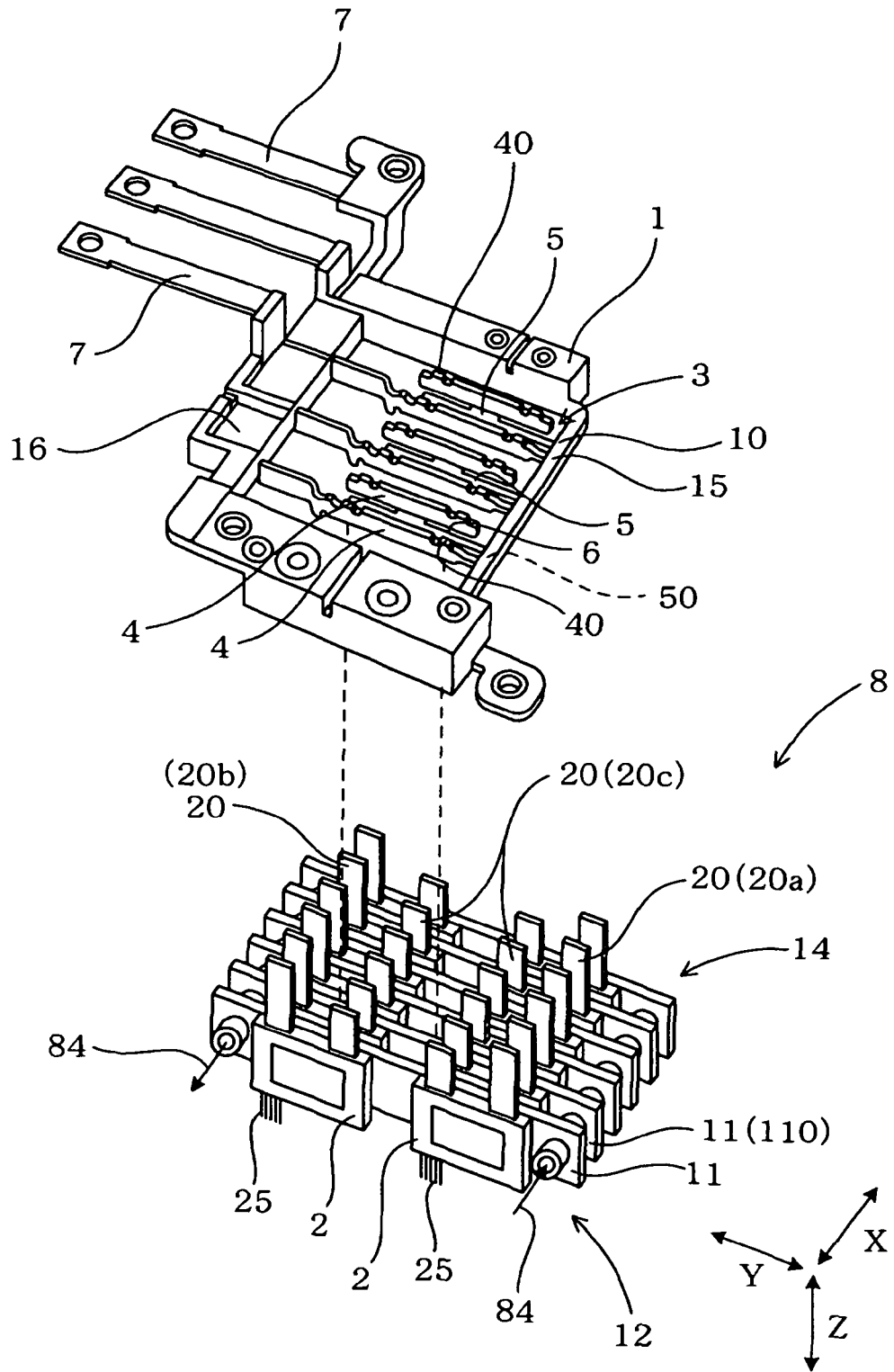
FIG. 4 is a perspective view showing a bus bar module and a stacked body, according to the first embodiment.

A bus bar module 1 of the present embodiment has a configuration, as shown in FIG. 4, to be electrically connected to power terminals 20 of the semiconductor modules 2 including a semiconductor element.

Figure 1:
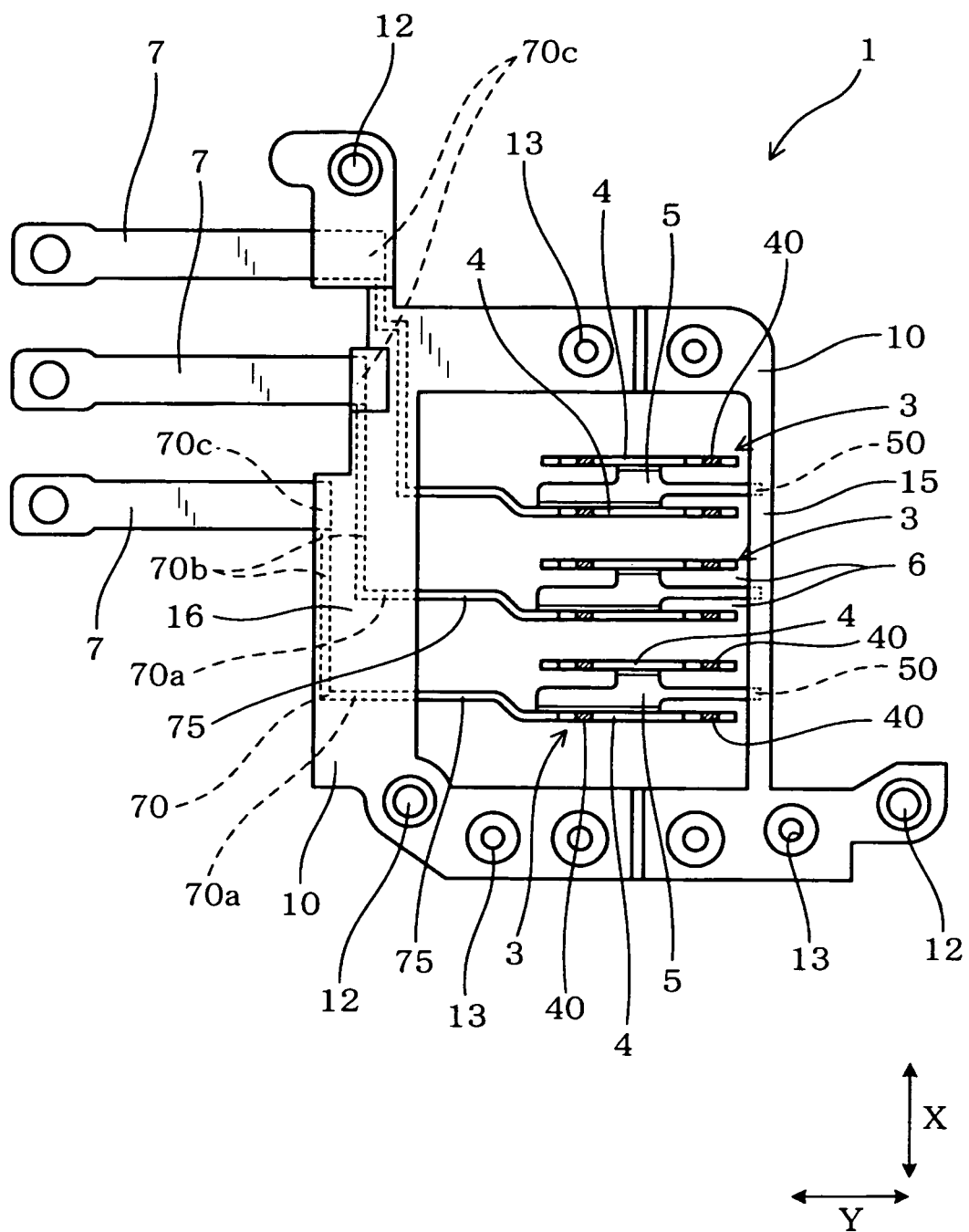
FIG. 1 is a plan view of a bus bar module according to a first embodiment.
Figure 2:
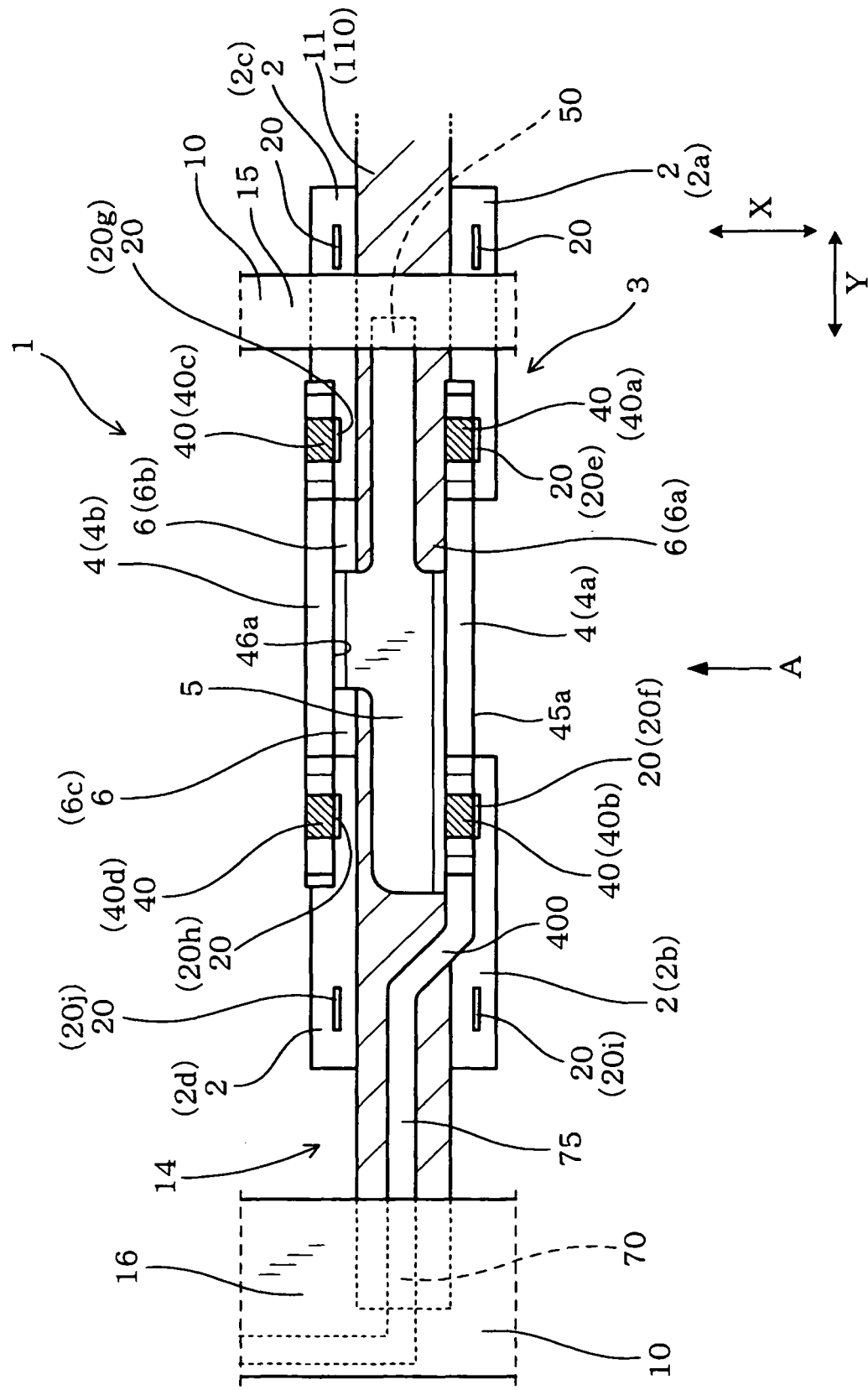
FIG. 2 is an enlarged plan view of a main part of a power conversion apparatus, according to the first embodiment.
Figure 3:
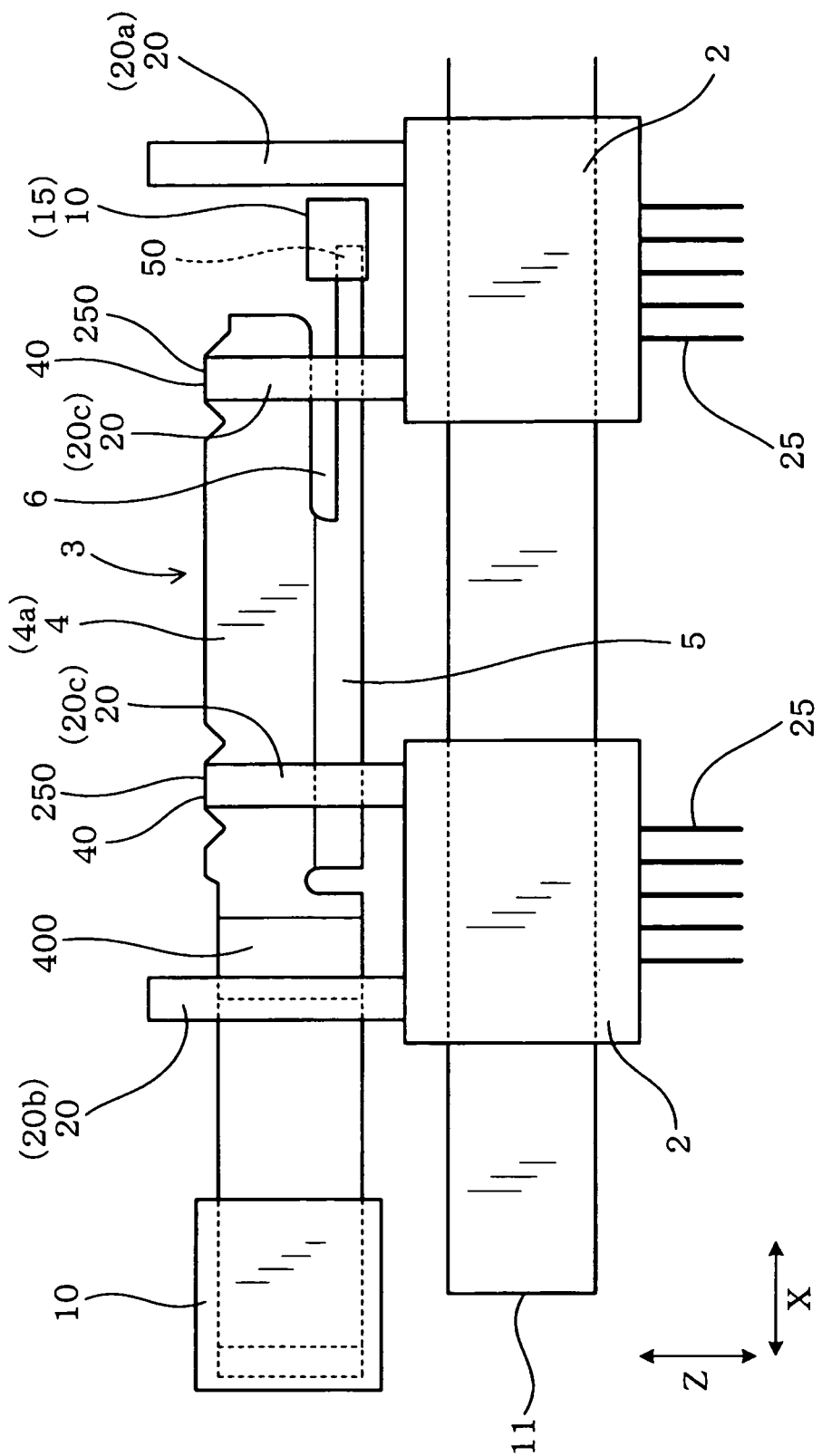
FIG. 3 is a view taken in the direction of arrow A of FIG. 2.

As shown in FIGS. 1 to 3, the bus bar module 1 includes bus bars 3 made of conductors, and a sealing member 10 made of resin which seals part of the bus bars 3.

The bus bar 3 has welded plates 4 and a held plate 5. The welded plate 4 includes welded parts 40 welded to the power terminals 20 of the semiconductor modules 2. The held plate 5 is held by the sealing member 10.

A part of the held plate 5 configures a sealed part 50 which is sealed by the sealing member 10.

In addition, as shown in FIG. 2, slits 6 (6a, 6b) are formed between the welded plates 4 (4a, 4b) and the held plate 5. The welded plates 4 and the held plate 5 are connected to each other at predetermined positions farther from the sealed part 50 than from the welded parts 40 (40a, 40c). That is, the welded plates 4 and the held plate 5 are connected to each other at predetermined positions in a state where the distances between the predetermined positions and the sealed part 50 are longer than the distances between the predetermined positions and the welded parts 40 (40a, 40c).

Hereinafter, detailed explanation is provided.

Figure 6:
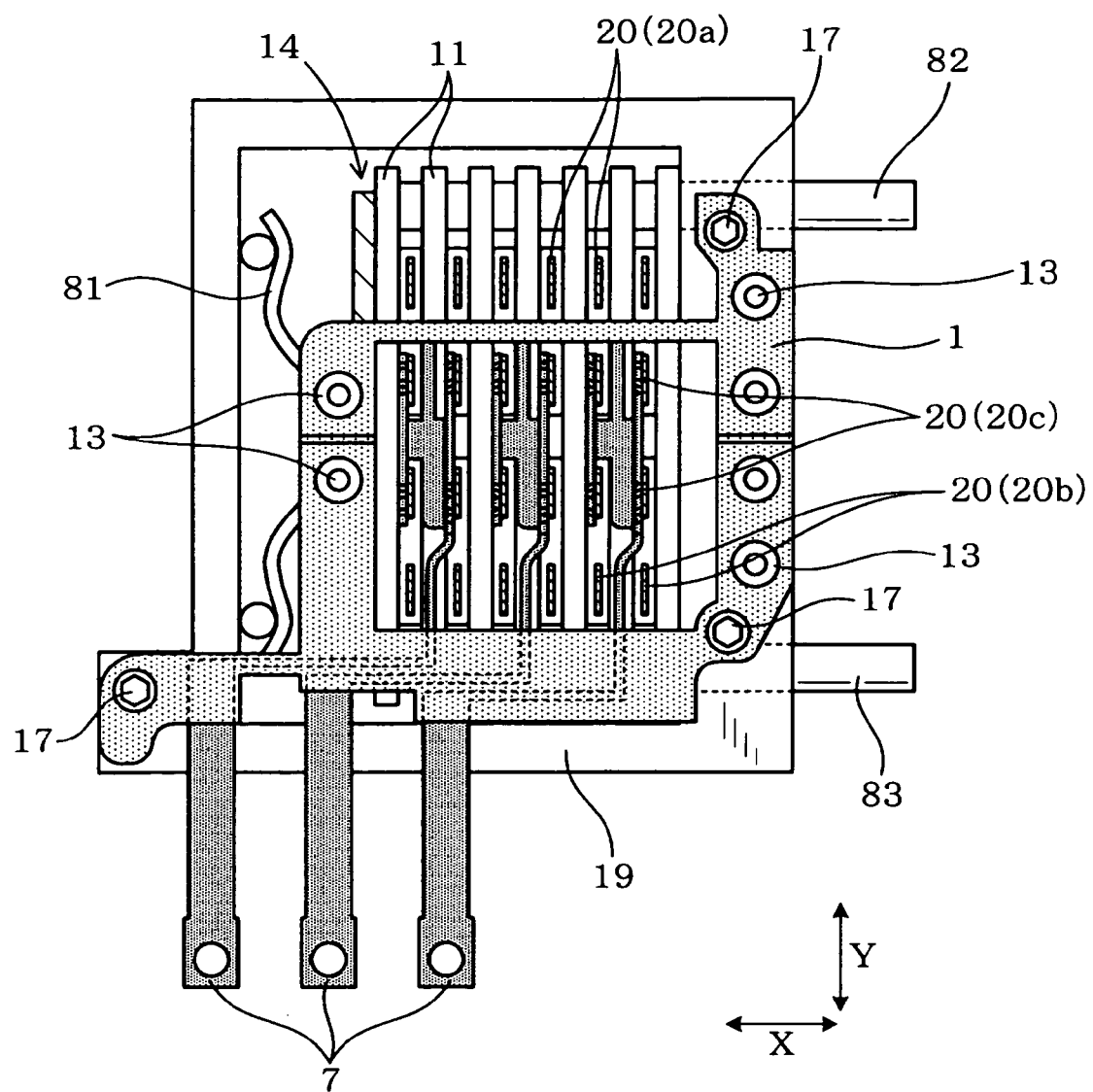
FIG. 6 is a plan view of the power conversion apparatus to which the bus bar module is attached, according to the first embodiment.

The bus bar module 1 according to the present embodiment is, as shown in FIGS. 4 and 6, used for a power conversion apparatus 8, The power conversion apparatus 8 includes a stacked body 14 in which the plurality of semiconductor modules 2 and cooling tubes 11 are stacked with each other. In the cooling tubes 11, refrigerant flow paths 110 through which a refrigerant 84 flows are formed.

The power conversion apparatus 8 is configured with the plurality of semiconductor modules 2. The power conversion apparatus 8 performs power conversion between DC power and AC power. As shown in FIG. 4, the power terminals 20 of the semiconductor modules 2 include positive electrode terminals 20a, negative electrode terminals 20b and AC terminals 20c. The positive electrode terminals 20a are connected to a positive electrode of a DC power source. The negative electrode terminals 20b are connected to a negative electrode of the DC power source. The AC terminals 20c are connected to an AC load. The bus bar module 1 of the present embodiment has a configuration to be connected to the AC terminals 20c. The AC terminals 20c of the semiconductor modules 2 are respectively connected to the welded parts 40 of the bus bar module 1.

The semiconductor module 2 includes a plurality of control terminals 25. The control terminals 25 are connected to a control circuit substrate, which is not shown. The control circuit substrate controls the operation of the semiconductor modules 2 to convert DC power applied between the positive electrode terminals 20a and the negative electrode terminals 20b into AC power. The AC power is outputted from the AC terminals 20c.

As shown in FIG. 1, the bus bar module 1 includes three bus bars 3, and a sealing member 10 which has a substantially rectangular frame shape and seals part of the bus bars. The sealing member 10 includes two side parts 15, 16 which are opposed to each other. Part of the bus bars 3 are sealed with the side parts 15, 16.

The three bus bars 3 are arranged in parallel with each other, and are held by the sealing member 10 in a state where the bus bars 3 are insulated from each other. The bus bar 3 includes the welded plates 4, the held plate 5, the sealed part 50, an extended plate 75, an output side sealed part 70, and a connecting terminal 7. The end of the held plate 5 is sealed with one side part 15 of the sealing member 10. The extended plate 75 extends from the welded plates 4 to the other side part 16 of the sealing member 10. The output side sealed part 70 is sealed with the side part 16 of the sealing member 10. The connecting terminals 7 extend from the searing member 10 to the exterior. The connecting terminals 7 are connected to U phase, V phase, and W phase of a three-phase AC motor 88 (refer to FIG. 8) described later.

A plurality of through-holes 12 are formed in the sealing member 10. Bolts are inserted into the through-holes 12 and are screwed into screw holes 190 formed in a frame 19 (refer to FIG. 5) described later. Thereby, the bus bar module 1 can be fixed to the frame 19. In addition, nuts 13 are buried in the sealing member 10. A positive electrode bus bar 38 (refer to FIG. 7) to be connected to the positive electrode terminals 20a and a negative electrode bus bar 39 to be connected to the negative electrode terminals 20b are fixed by using the bolts 33 and the nuts 13.

As shown in FIG. 2, each of the bus bars 3 includes the two welded plates 4a, 4b with the held plate 5 being interposed therebetween. One welded plate 4a includes a first welded part 40a and a second welded part 40b. The other welded plate 4b includes a third welded part 40c and a fourth welded part 40d. A first slit 6a is formed between one welded plate 4a and the held plate 5. A second slit 6b and a third slit 6c are formed between the other welded plate 4b and the held plate 5. One welded plate 4a and the held plate 5 are connected to each other at a predetermined position farther from the sealed part 50 than from the first welded part 40a. The other welded plate 4b and the held plate 5 are connected to each other at a predetermined position farther from the sealed part 50 than from the third welded part 40c. In addition, the other welded plate 4b and the held plate 5 are connected to each other at a predetermined position farther from the output side sealed part 70 than from the fourth welded part 40d.

As shown FIG. 2, when viewed from the projecting direction of the power terminal (the direction perpendicular to the plane of paper: Z direction), the first slit 6a is formed between the first welded part 40a and the held plate 5. The second slit 6b is formed between the third welded part 40c and the held plate 5. In addition, the third slit 6c is formed between the fourth welded part 40d and the held plate 5. No slits are formed between the second welded part 40b and the held plate 5.

As shown in FIG. 2, the welded plate 4b and the held plate 5 are connected to each other at the central portion of welded plate 4b in the width direction (Y direction) orthogonal to both the stacked direction (X direction) of the stacked body 14 and the Z direction.

As shown in FIGS. 2 and 3, two welded plates 4a, 4b erect (stand) in the Z direction so as to be parallel to each other. The bus bar 3 is formed by bending one metal plate. Four power terminals 20 (20e to 20h) are welded to the bus bar 3.

The surfaces of the two power terminals 20e, 20f contact an outside main surface 45a, which is a main surface of one welded plate 4a and exists at the side opposed to the held plate 5. The power terminals 20e, 20f are welded to the welded plate 4a in a state where the surfaces of the power terminal 20e, 20f contact the outside main surface 45a.

The surfaces of the two power terminals 20g, 20h contact an inside main surface 46a, which is a main surface of the other welded plate 4b and exists at the held plate 5 side. The power terminals 20g, 20h are welded to the welded plate 4b in a state where the surfaces of the power terminal 20g, 20h contact the inside main surface 46a. The power terminals 20g, 20h are respectively located in the slits 6b, 6c.

In addition, the side part 15 of the sealing member 10 extends in the X direction, and is located between two power terminals 20, 20 of the semiconductor modules 2a, 2b. The end (sealed part 50) of the held plate 5 is sealed with the side part 15.

As shown in FIG. 2, a bend part 400 is formed between the welded plate 4a and the extended plate 75. By forming the bend part 400, the extended plate 75 is separated from the power terminal 20i. Thereby, the extended plate 75 and the power terminal 20i are prevented from contacting each other.

As shown in FIG. 1, the output side sealed part 70 includes a first part 70a extending from the extended plate 75 in the Y direction, a second part 70b extending from the first part 70a in the X direction, and a third part 70c extending from the second part 70b in the Z direction. The connecting terminal 7 extends from the third part 70c in the Y direction.

As shown FIG. 3, the welded parts 40 are formed on the end face of the welded plate 4. When welding is performed, the welded parts 40 are positioned so as to be flush with end faces 250 of the power terminals 20, and the main surface (the outside main surface 45a or the inside main surface 46a shown in FIG. 2) of the welded plate 4 is brought into close contact with the power terminals 20. Then, TIG welding or the like is performed to the welded parts 40 and the end faces 250. Thereby, the bus bar 3 and the semiconductor module 2 are electrically connected to each other.

Figure 5:
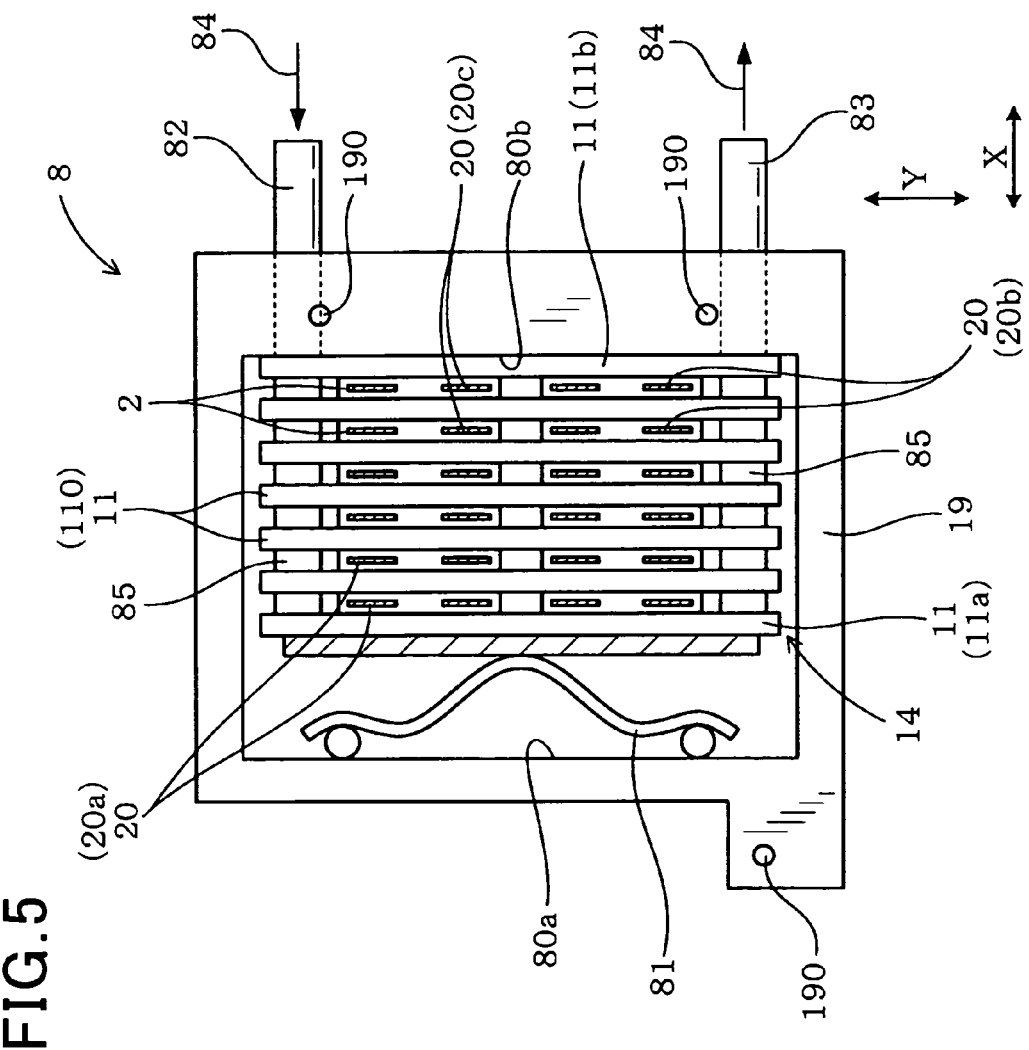
FIG. 5 is a plan view of the power conversion apparatus from which the bus bar module is removed, according to the first embodiment.

As shown in FIG. 5, the power conversion apparatus 8 includes the frame 19 for fixing the stacked body 14. The frame 19 has a substantially rectangular shape when viewed from the Z direction. The frame 19 has two inner surfaces 80a, 80b orthogonal to the X direction. A spring member 81 is provided between one inner surface 80a and the stacked body 14. By using the elastic force of the spring member 81, the stacked body 14 is pressed to the other inner surface 80b. Hence, the stacked body 14 is fixed inside the frame 19 while the contact pressure between the semiconductor modules 2 and the cooling tubes 11 is kept.

In the present embodiment, the frame 19 has the two inner surfaces 80a, 80b orthogonal to the X direction. Although the spring member 81 is provided between one inner surface 80a and the stacked body 14, the spring member 81 may be provided between the other inner surface 80b and the stacked body 14. In this case, the stacked body 14 is pressed to one inner surface 80a of the frame 19.

Two cooling tubes 11 adjacent to each other in the X direction are connected to each other at both ends in the Y direction thereof via a pair of connecting tubes 85. A cooling tube 11b of a plurality of cooling tubes 11 is provided with an introduction pipe 82 and a discharge pipe 83. The cooling tube 11b is located at the end of the stacked body 14 in the X direction opposed to the side where the spring member 81 is provided. The introduction pipe 82 introduces the refrigerant 84 into the refrigerant flow paths 110. The discharge pipe 83 discharges the refrigerant 84 from the refrigerant flow paths 110. When the refrigerant 84 is introduced from the introduction pipe 82, the refrigerant 84 is distributed between the refrigerant flow paths 110 and flows therein, and is discharged from the discharge pipe 83. Thereby, the semiconductor modules 2 are cooled.

The frame 19 is formed with a plurality of screw holes 190. As shown in FIG. 6, bolts 17 are inserted into the through-holes 12 (refer to FIG. 1) formed in the sealing member 10 of the bus bar module 1, and are screwed into the screw holes 190, thereby fixing the bus bar module 1 to the frame 19.

Figure 7:
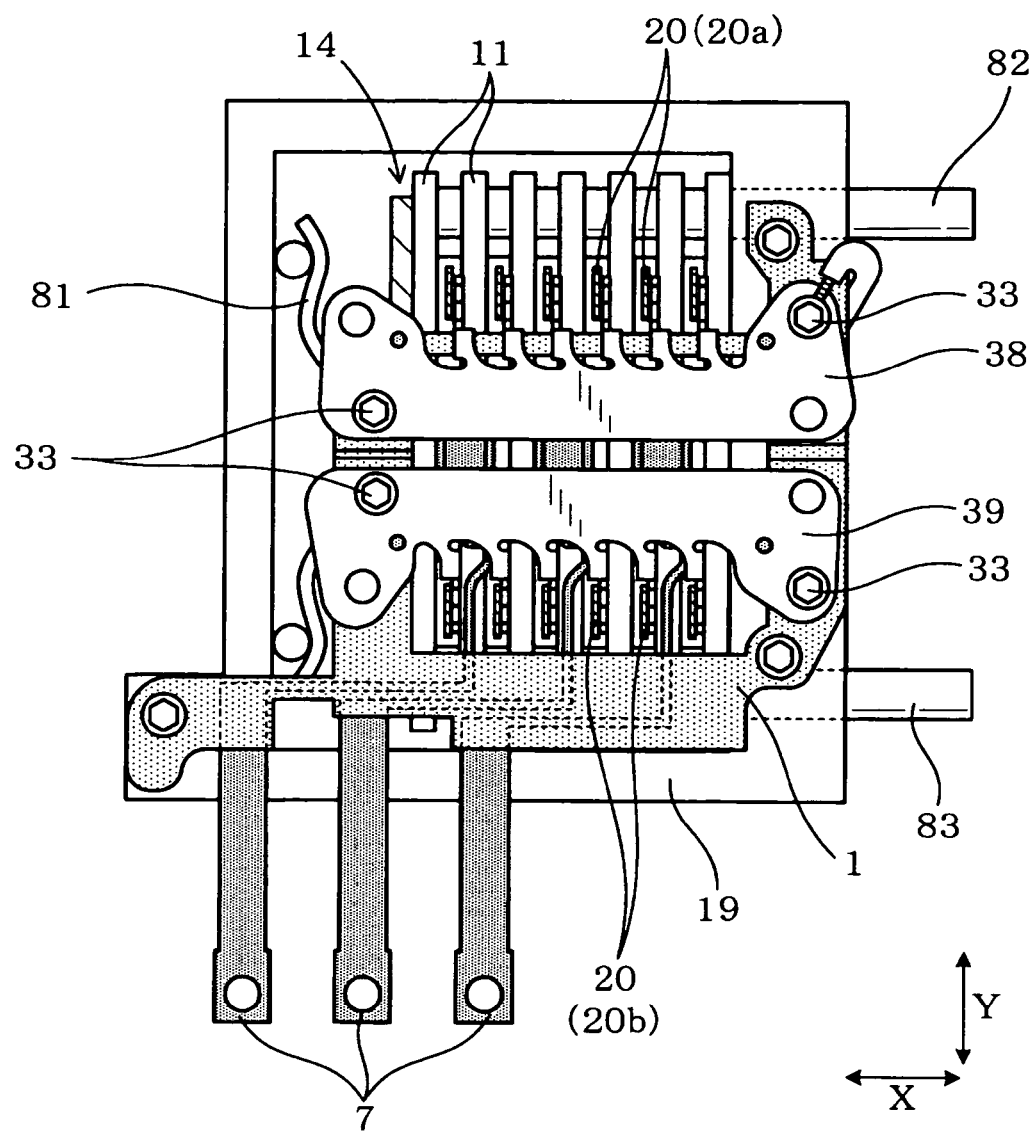
FIG. 7 is a plan view of the power conversion apparatus to which the bus bar module, a positive electrode bus bar, and a negative electrode bus bar are attached, according to the first embodiment.

As shown in FIG. 7, the positive electrode terminals 20a and the negative electrode terminals 20b of the semiconductor modules 2 are respectively welded to the positive electrode bus bar 38 and the negative electrode bus bar 39. Bolt insertion holes (not shown) are formed in the positive electrode bus bar 38 and the negative electrode bus bar 39 so as to penetrate therethrough. The bolts 33 are inserted into the bolt insertion holes, and are screwed into the nuts 13 (refer to FIG. 6) buried in the sealing member 10 of the bus bar module 1. Thereby, the positive electrode bus bar 38 and the negative electrode bus bar 39 are fixed to the bus bar module 1.

Figure 8:
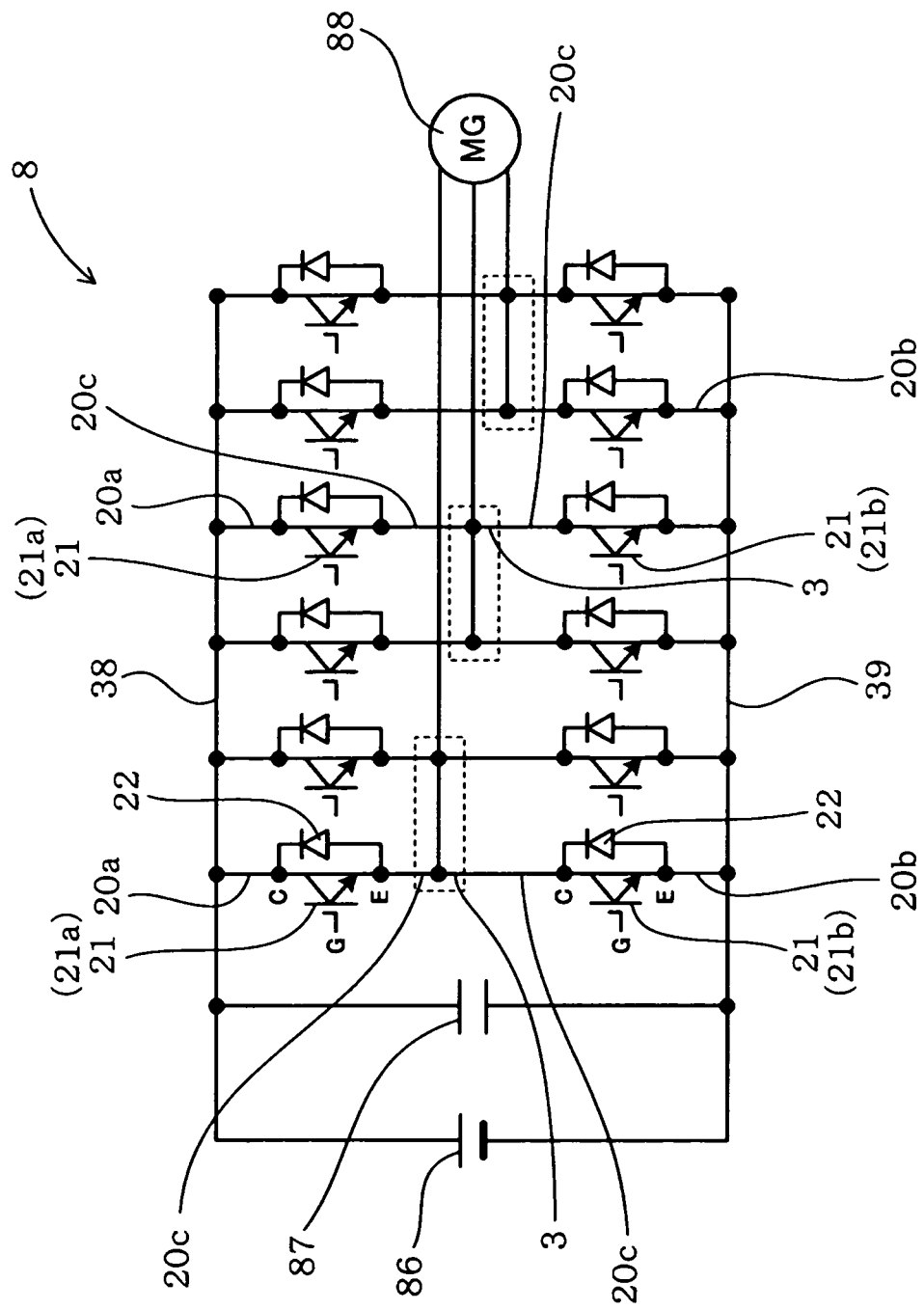
FIG. 8 is a circuit diagram of the power conversion apparatus according to the first embodiment.

Next, the circuit of the power conversion apparatus 8 is explained. As shown in FIG. 8, the power conversion apparatus 8 includes a plurality of IGBT (insulated gate bipolar transistor) elements 21 (semiconductor elements), free wheel diodes 22 connected to the IGBT elements 21 by inverse-parallel connection, a smoothing capacitor 87, the positive electrode bus bar 38, and the negative electrode bus bar 39. One semiconductor module 2 (refer to FIG. 4) incorporates one IGBT element 21 and one free wheel diode 22. A DC power source 86 and a capacitor 87 are connected to the positive electrode bus bar 38 and the negative electrode bus bar 39.

The IGBT elements 21 include upper arm side IGBT elements 21a and lower arm side IGBT elements 21. Collector terminals (positive electrode terminals 20a) of the upper arm side IGBT elements 21a are connected to the positive electrode bus bar 38. Emitter terminals (negative electrode terminals 20b) of the lower arm side IGBT elements 21b are connected to the negative electrode bus bar 39.

The emitter terminals (AC terminals 20c) of the upper arm side IGBT elements 21a and the collector terminals (AC terminals 20c) of the lower arm side IGBT elements 21b are connected to each other by the bus bars 3 described above. The bus bars 3 are connected to the three-phase AC motor 88. As described above, the bus bar module 1 of the present embodiment is used, in the power conversion apparatus 8, to connect the emitter terminals (AC terminals 20c) of the upper arm side IGBT elements 21a and the collector terminals (AC terminals 20c) of the lower arm side IGBT elements 21b to each other, and to connect the AC terminals 20c to the three-phase AC motor 88.

Figure 9:
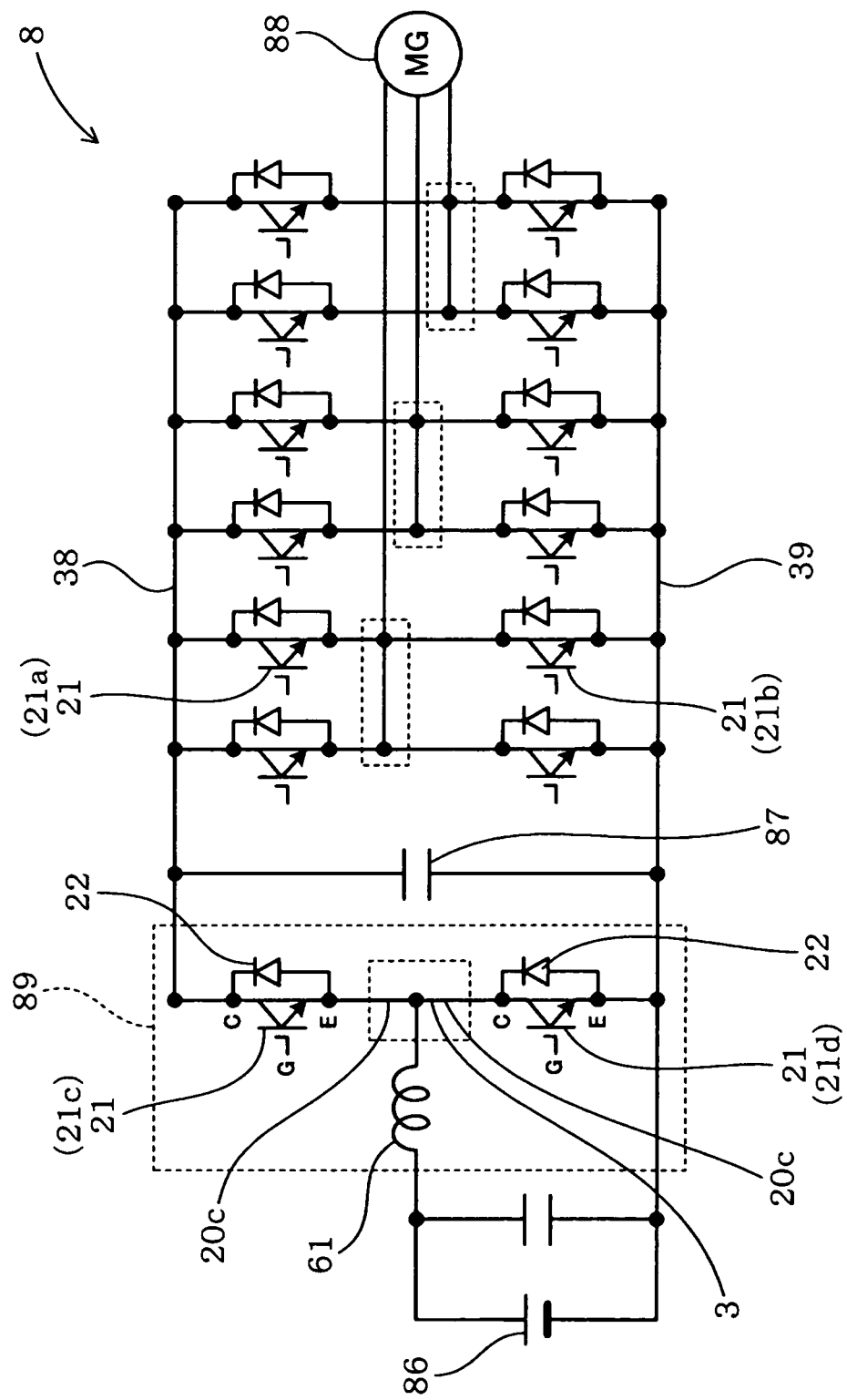
FIG. 9 is another circuit diagram of the power conversion apparatus according to the first embodiment.

The bus bar module 1 of the present embodiment can also be used for the power conversion apparatus 8 shown in FIG. 9. This power conversion apparatus 8 includes a booster circuit 89 for boosting the voltage of the DC power source 86. The booster circuit 89 includes two IGBT elements 21, free wheel diodes 22 connected to the IGBT elements 21 by inverse-parallel connection, and a choke coil 61. Each of the semiconductor modules 2 (refer to FIG. 4) incorporates one IGBT element 21 and one free wheel diode 22. An emitter terminal (AC terminal 20c) of one IGBT element 21c included in the two IGBT elements 21 and a collector terminal (AC terminal 20c) of the other IGBT element 21d included in the two IGBT elements 21 are connected to each other by the bus bar 3. As described above, the bus bar module 1 of the present embodiment can be used for connecting the AC terminals 20c of the IGBT elements 21c, 21d configuring the booster circuit 89 to each other.

Note that, in the present embodiment, the power conversion apparatus 8 is configured by using the IGBT elements 21. However, other switching elements such as bipolar transistors and power MOSFETs (metal oxide semiconductor field-effect transistors) may be used.

Advantages of the present embodiment will be explained. As shown in FIG. 2, the bus bar module 1 of the present embodiment has the bus bar 3 including the welded plate 4a and the held plate 5. The slit 6a is formed between the welded plate 4a and the held plate 5. The welded plate 4a and the held plate 5 are connected to each other at a predetermined position farther from the sealed part 50 than from the first welded part 40a. That is, the welded plate 4a and the held plate 5 are connected to each other at a predetermined position in a state where the distance between the predetermined position and the sealed part 50 is longer than the distance between the predetermined position and the first welded part 40a.

According to the above configuration, the heat generated from the first welded part 40a when the first welded part 40a is welded to the power terminal 20 is first transferred in the direction opposed to the sealed part 50. Thereafter, the heat is transferred to the held plate 5 and is then moved to the sealed part 50. Hence, the transfer distance of the welding heat from the first welded part 40a to the sealed part 50 can be lengthened. Hence, the welding heat is easily released during conduction, whereby the amount of the welding heat reaching the sealed part 50 can be reduced. As a result, the sealing member 10 around the sealed part 50 can be easily prevented from being melted by the welding heat.

In addition, in the present embodiment, as shown in FIG. 2, the bus bar 3 includes the two welded plates 4a, 4b with the held plate 5 being interposed therebetween. The slits 6a, 6b are respectively formed between the welded plates 4a, 4b and the held plate 5. As described above, one welded plate 4a and the held plate 5 are connected to each other at a predetermined position farther from the sealed part 50 than from the first welded part 40a. The other welded plate 4b and the held plate 5 are connected to each other at a predetermined position farther from the sealed part 50 than from the third welded part 40c.

According to the above configuration, the transfer distance from the third welded part 40c to the sealed part 50 can be lengthened. As a result, when welding, the sealed part 50 can be prevented from being melted by the heat generated from the third welded part 40c.

In addition, since the bus bar 3 includes the two welded plates 4a, 4b, more power terminals 20 can be welded, whereby the bus bar 3 can conduct more current. When more current flows through the bus bar 3, more resistance heat is generated. Hence, the sealing member 10 is required to be protected from the resistance heat. Since the bus bar 3 of the present embodiment transfers less heat to the sealed part 50, as described above, the sealed part 50 can effectively be prevented from being melted even when more resistance heat is generated due to the current.

In addition, in the present embodiment, as shown FIG. 2, a part of the bus bar 3 serves as the output side sealed part 70 which is sealed with the sealing member 10. The slit 6c is formed between the fourth welded part 40d and the held plate 5. In addition, the other welded plate 4b and the held plate 5 are connected to each other at a predetermined position farther from the output side sealed part 70 than from the fourth welded part 40d. That is, the other welded plate 4b and the held plate 5 are connected to each other at a predetermined position in a state where the distance between the predetermined position and the output side sealed part 70 is longer than the distance between the predetermined position and the fourth welded part 40d.

According to the above configuration, the welding heat generated from the fourth welded part 40d when welding is first transferred in the direction opposed to the output side sealed part 70. Thereafter, the heat is transferred to the held plate 5 and is then moved to the output side sealed part 70 through the extended plate 75. Hence, the transfer distance of the welding heat from the fourth welded part 40d to the output side sealed part 70 can be lengthened. Hence, the welding heat is easily released during conduction, whereby the amount of the welding heat reaching the output side sealed part 70 can be reduced. As a result, the sealing member 10 in around the output side sealed part 70 can be easily prevented from being melted by the welding heat.

As described above, according to the present embodiment, a bus bar module can be provided in which a sealing member is not easily melted by the heat generated when welding a bus bar.

Note that, in the present embodiment, the refrigerant flow paths 110 are formed by using the cooling tubes 11, which are brought into contact with the semiconductor modules 2. However, the configuration of the power conversion apparatus 8 is not limited to the above configuration. That is, for example, the refrigerant flow paths 110 may be provided so that the refrigerant 84 directly contact the semiconductor modules 2.

Second Embodiment

Figure 10:
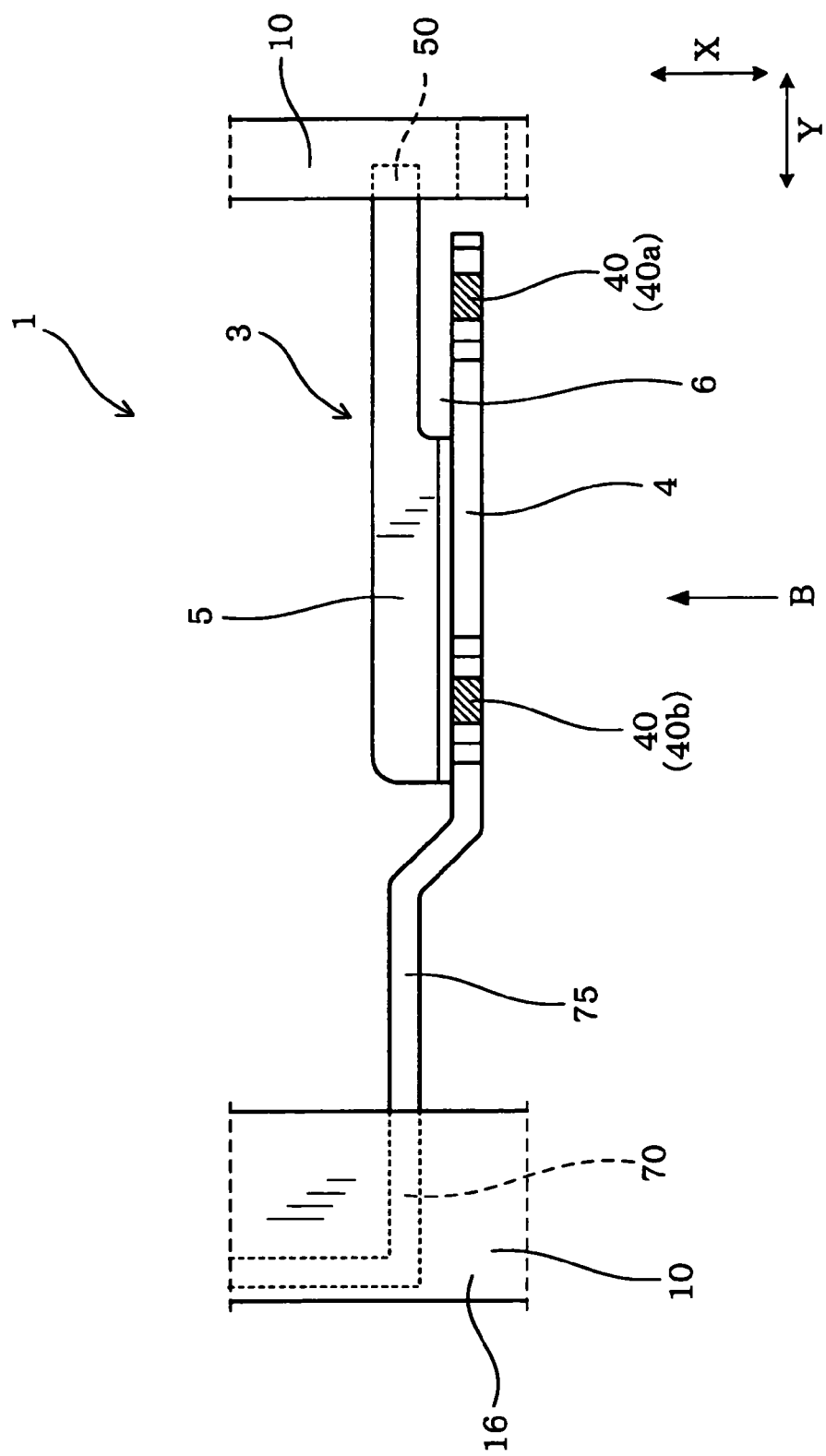
FIG. 10 is an enlarged plan view of a bus bar module according to a second embodiment.
Figure 11:
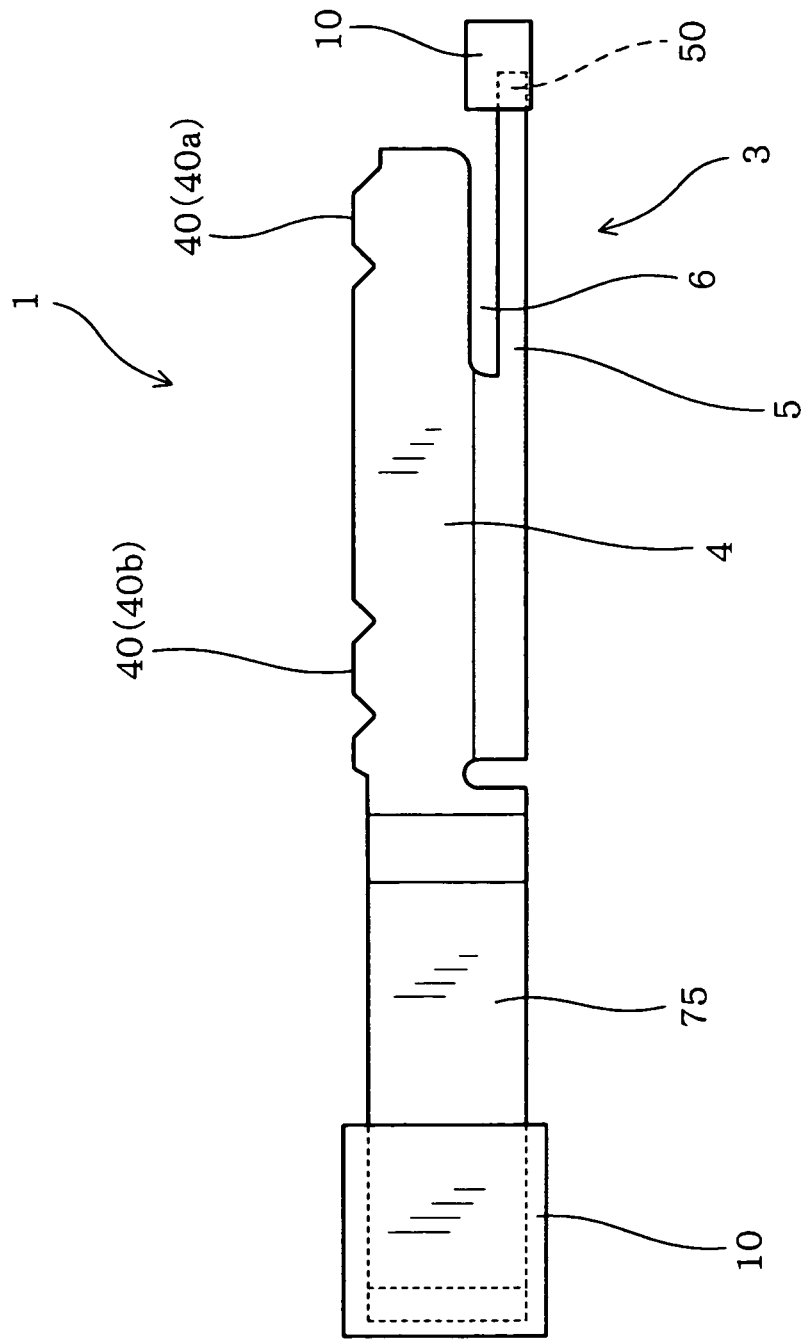
FIG. 11 is a view taken in the direction of arrow B of FIG. 10.

In the present embodiment, the number of the welded plates 4 is changed. In the present embodiment, as shown in FIGS. 10 and 11, one bus bar 3 is formed with only one welded plate 4. The welded plate 4 has two welded part 40a, 40b at the end face thereof. A part of the held plate 5 serves as the sealed part 50 which is sealed with the sealing member 10. The bus bar 3 includes the extended plate 75 which extends from the welded plate 4 to the side part 16 side and in the Y direction. A part of bus bar 3 serves as the output side sealed part 70 sealed with the sealing member 10. The slit 6 is formed between the welded plate 4 and the held plate 5. In addition, the welded plate 4 and the held plate 5 are connected to each other at a predetermined position farther from the sealed part 50 than from the first welded part 40a.

Other configurations are the same as those of the first embodiment.

Advantages of the present embodiment will be explained. The present embodiment is effectively applied to a case where the number of the power terminals 20 to be welded to the welded plate 4 is small. That is, when welded parts other than the two welded parts 40a, 40b are not required, the number of the welded plates 4 can be decreased, whereby the bus bar module 1 can be miniaturized.

In addition, according to the present embodiment, as in the case of the first embodiment, the transfer distance of the welding heat from the first welded part 40a to the sealed part 50 can be lengthened. Hence, the welding heat is easily released, whereby the amount of the welding heat reaching the sealed part 50 can be reduced. As a result, the sealing member 10 around the sealed part 50 can be prevented from melting.

The other same advantages as those of the first embodiment are provided.

Third Embodiment

Figure 12:
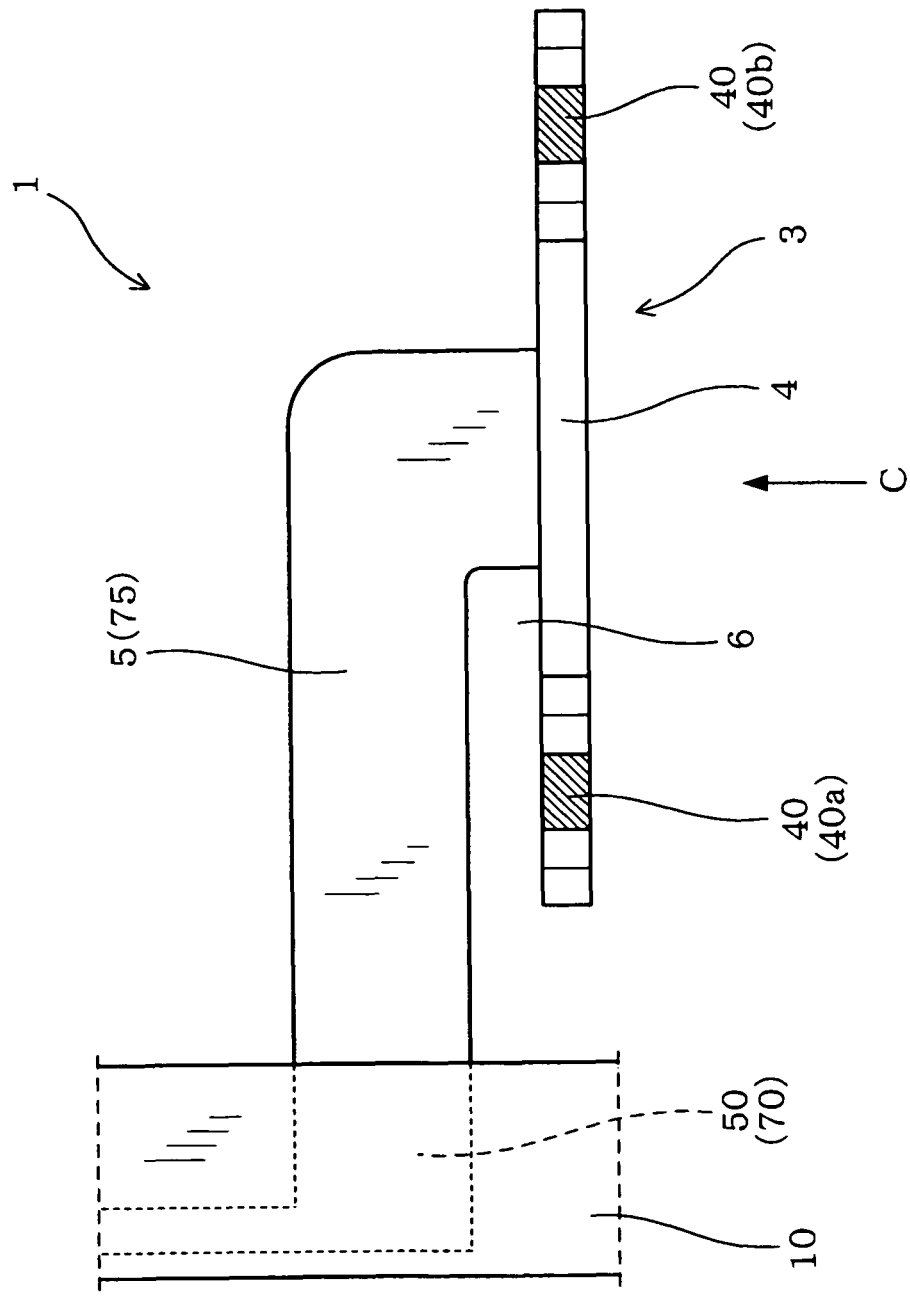
FIG. 12 is an enlarged plan view of a bus bar module according to a third embodiment.
Figure 13:
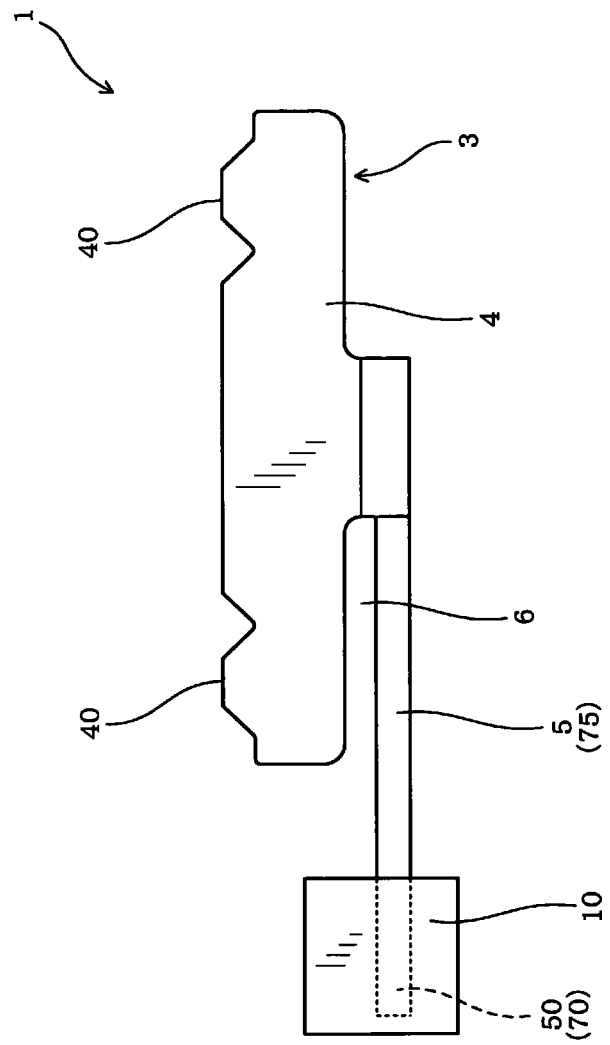
FIG. 13 is a view taken in the direction of arrow C of FIG. 12.

In the present embodiment, as shown in FIGS. 12 and 13, the held plate 5 and the extended plate 75 are integrated with each other, and the bus bar 3 has a cantilever structure. In the present embodiment, the welded plate 4 includes two welded part 40a, 40b. The slit 6 is formed between the first welded part 40a and the held plate 5. The welded plate 4 and the held plate 5 are connected to each other at a predetermined position farther from the sealed part 50 than from the first welded part 40a.

Other configurations are the same as those of the first embodiment.

Advantages of the present embodiment will be explained. In the present embodiment, the held plate 5 and the extended plate 75 are integrated with each other. Hence, the bus bar module 1 can be more simply configured.

In addition, according to the present embodiment, as in the case of the first embodiment, the transfer distance of the welding heat from the first welded part 40a to the sealed part 50 can be lengthened. Hence, the welding heat is easily released, whereby the amount of the welding heat reaching the sealed part 50 can be reduced. As a result, the resin around the sealed part 50 can be prevented from being melted by the welding heat.

The other same advantages as those of the first embodiment are provided.

Fourth Embodiment

Figure 14:
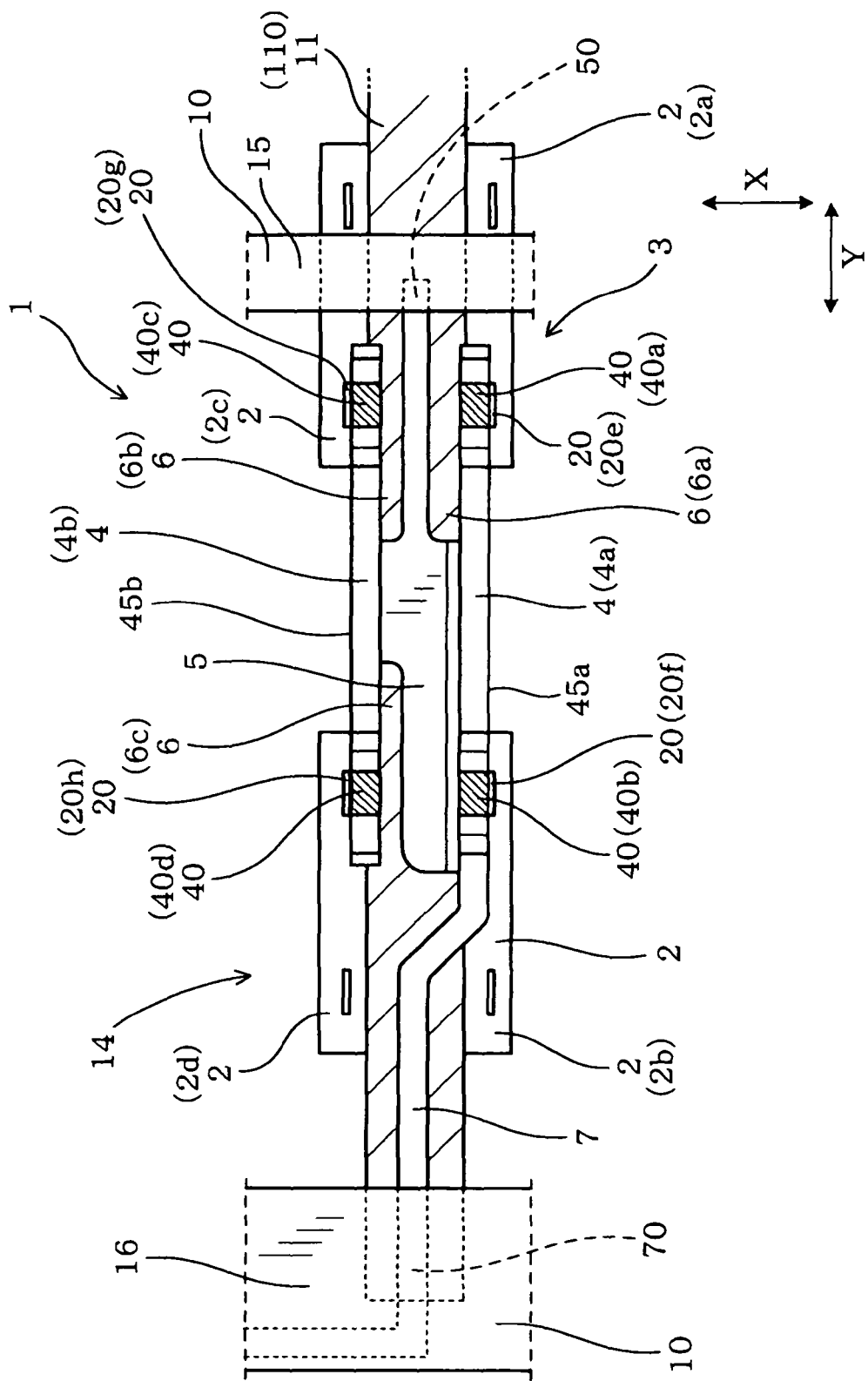
FIG. 14 is an enlarged plan view of a main part of a power conversion apparatus, according to a fourth embodiment.

In the present embodiment, the portions at which the power terminals 20 contact the bus bar 3 are changed. As shown in FIG. 14, as in the case of the first embodiment, the stacked body 14 is provided in which the plurality of semiconductor modules 2 and the plurality of cooling tubes 11 for cooling the semiconductor modules 2 are stacked with each other. The bus bar 3 includes the two welded plates 4 (4a, 4b) with the held plate 5 being interposed therebetween. In addition, the two welded plates 4a, 4b and the held plate 5 are interposed between the two power terminals 20 of the semiconductor modules 2 adjacent to each other in the X direction.

That is, the two welded plates 4a, 4b and the held plate 5 are interposed between the two power terminals 20e, 20g opposed to each other in the X direction, and between the two power terminals 20f, 20h opposed to each other in the X direction.

The welded plates 4 erect (stand) in the thickness direction (Z direction) of the held plate 5. The two welded plates 4a, 4b are parallel to each other. The surfaces of the power terminals 20e, 20f contact an outside main surface 45a, which is a main surface of one welded plate 4a and exists at the side opposed to the held plate 5. The power terminals 20e, 20f are welded to one welded plate 4a in a state where the surfaces of the power terminal 20e, 20f contact the outside main surface 45a.

In addition, the surfaces of the power terminals 20g, 20h contact an outside main surface 45b, which is a main surface of the other welded plate 4b and exists at the side opposed to the held plate 5. The power terminals 20g, 20h are welded to the other welded plate 4b in a state where the surfaces of the power terminal 20g, 20h contact the outside main surface 45b.

Other configurations are the same as those of the first embodiment.

Advantages of the present embodiment will be explained. According to the above configuration, the bus bar 3 can be miniaturized. When the bus bar 3 has two welded plates 4a, 4b, the bus bar 3 easily becomes large in size. However, by interposing the two welded plates 4a, 4b and the held plate 5 between the two power terminals 20 adjacent to each other in the X direction, the total length in the X direction of the two welded plates 4a, 4b and the held plate 5 can be decreased. Hence, the bus bar 3 can be miniaturized, thereby reducing the amount of the metallic material configuring the bus bar 3. Thereby, the manufacturing cost of the bus bar 3 can be reduced.

The other same advantages as those of the first embodiment are provided.

Fifth Embodiment

Figure 15:
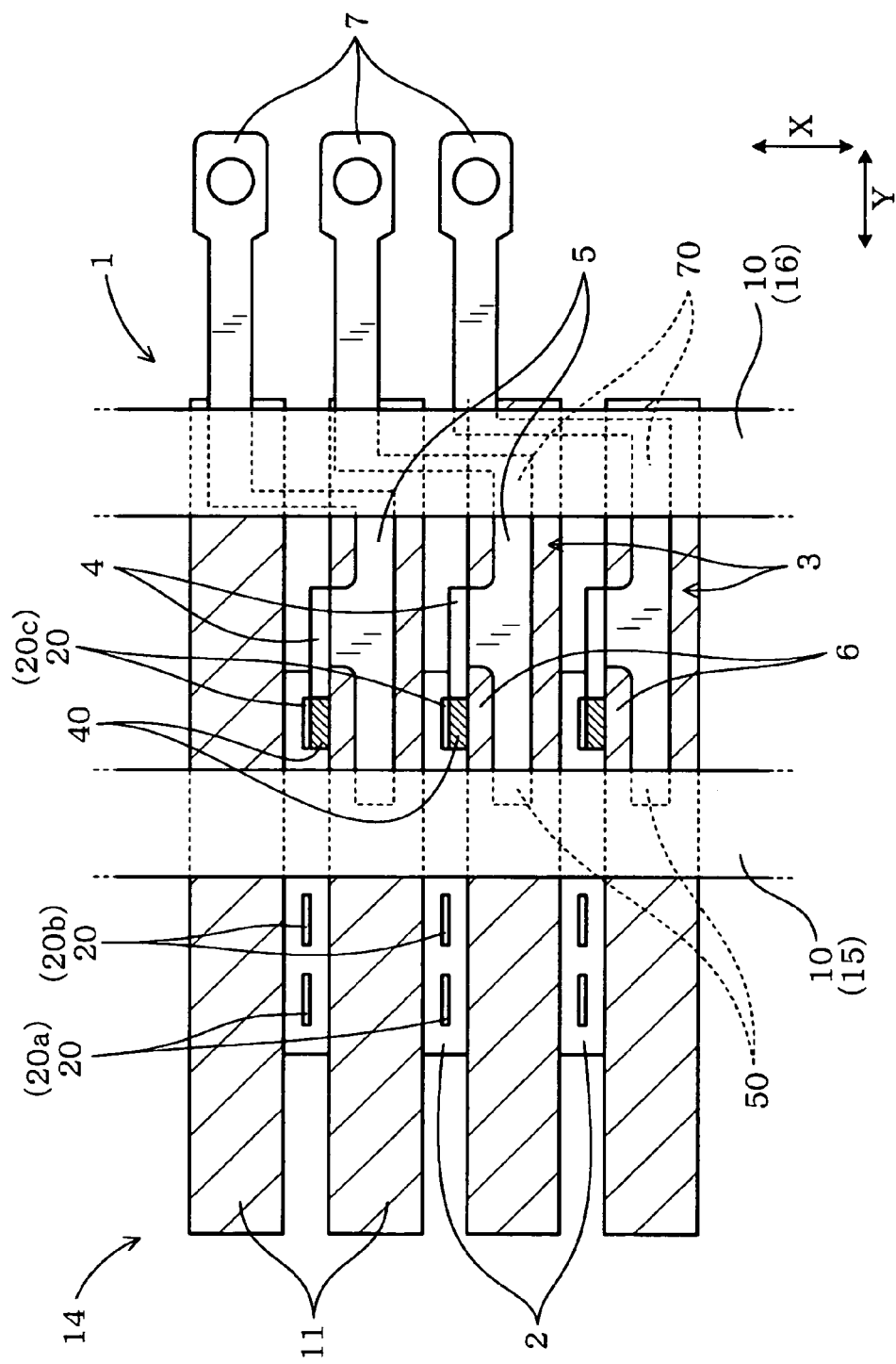
FIG. 15 is an enlarged plan view of a main part of a power conversion apparatus, according to a fifth embodiment.

In the present embodiment, the shapes of the bus bar 3 and the semiconductor module 2 are modified. As shown in FIG. 15, in the present embodiment, each of the semiconductor modules 2 has three power terminals 20. Each of the semiconductor modules 2 incorporates two IGBT elements 21a, 21b (refer to FIGS. 8 and 9). In the semiconductor module 2, a collector terminal of the upper arm side IGBT element 21a serves as the positive electrode terminal 20a. An emitter terminal of the lower arm side IGBT element 21b serves as the negative electrode terminal 20b. In addition, in the semiconductor module 2, an emitter terminal of the upper arm side IGBT element 21a and a collector terminal of the lower arm side IGBT element 21b are connected to each other, thereby configuring one common AC terminal 20c.

In addition, the bus bar module 1 of the present embodiment includes three bus bars 3. Each of the bus bars 3 includes only one welded part 40. Each of the bus bars 3 includes the held plate 5 and one welded plate 4 erecting (standing) in the thickness (Z direction) of the held plate 5. The welded part 40 is formed on the end face of the welded plate 4. A part of the held plate 5 serves as the sealed part 50 sealed with the sealing member 10.

The slit 6 is formed between the welded part 40 and the held plate 5. The welded plate 4 and the held plate 5 are connected to each other at a predetermined position farther from the sealed part 50 than from the welded part 4.

The sealing member 10 has a substantially rectangular frame shape when viewed from the Z direction (refer to FIG. 1), as in the case of the first embodiment. The sealing member 10 includes two side parts 15, 16 which are opposed to each other. The side parts 15, 16 extend in the X direction. One side part 15 seals the sealed part 50, and the other side part 16 seals the output side sealed part 70. In addition, one side part 15 is located between the negative electrode terminal 20b and AC terminal 20c of the semiconductor module 2.

Other configurations are the same as those of the first embodiment.

Advantages of the present embodiment will be explained. In the present embodiment, since each of the welded plates 4 is formed with only one welded part 40, the length of the welded plate 4 in the Y direction can be decreased. In addition, part of the sealing member 10 (side part 15) holding the held plate 5 is located between the power terminals 20b and 20c. Hence, the length of the held plate 5 in the Y direction can be decreased. As a result, the bus bar 3 can be miniaturized, whereby the manufacturing cost of the bus bar module 1 can be reduced.

The other same advantages as those of the first embodiment are provided.

Sixth Embodiment

Figure 16:
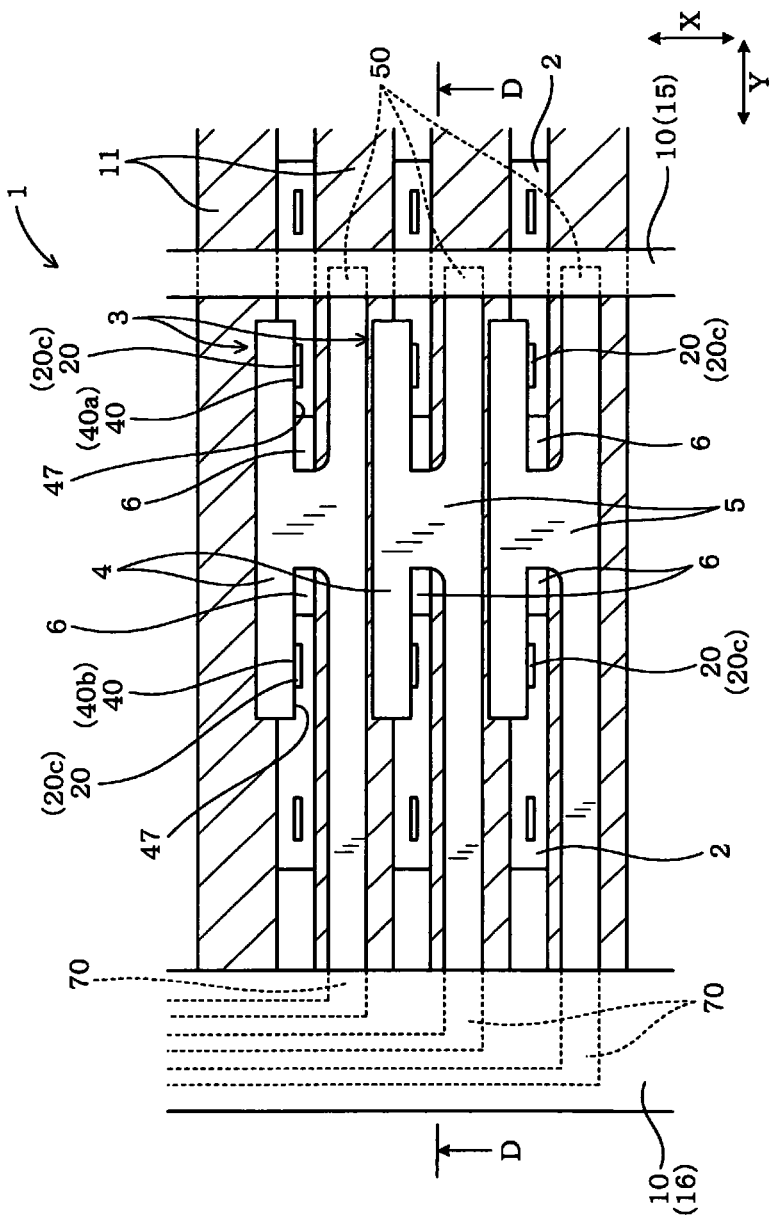
FIG. 16 is an enlarged plan view of a main part of a power conversion apparatus, according to a sixth embodiment.
Figure 17:
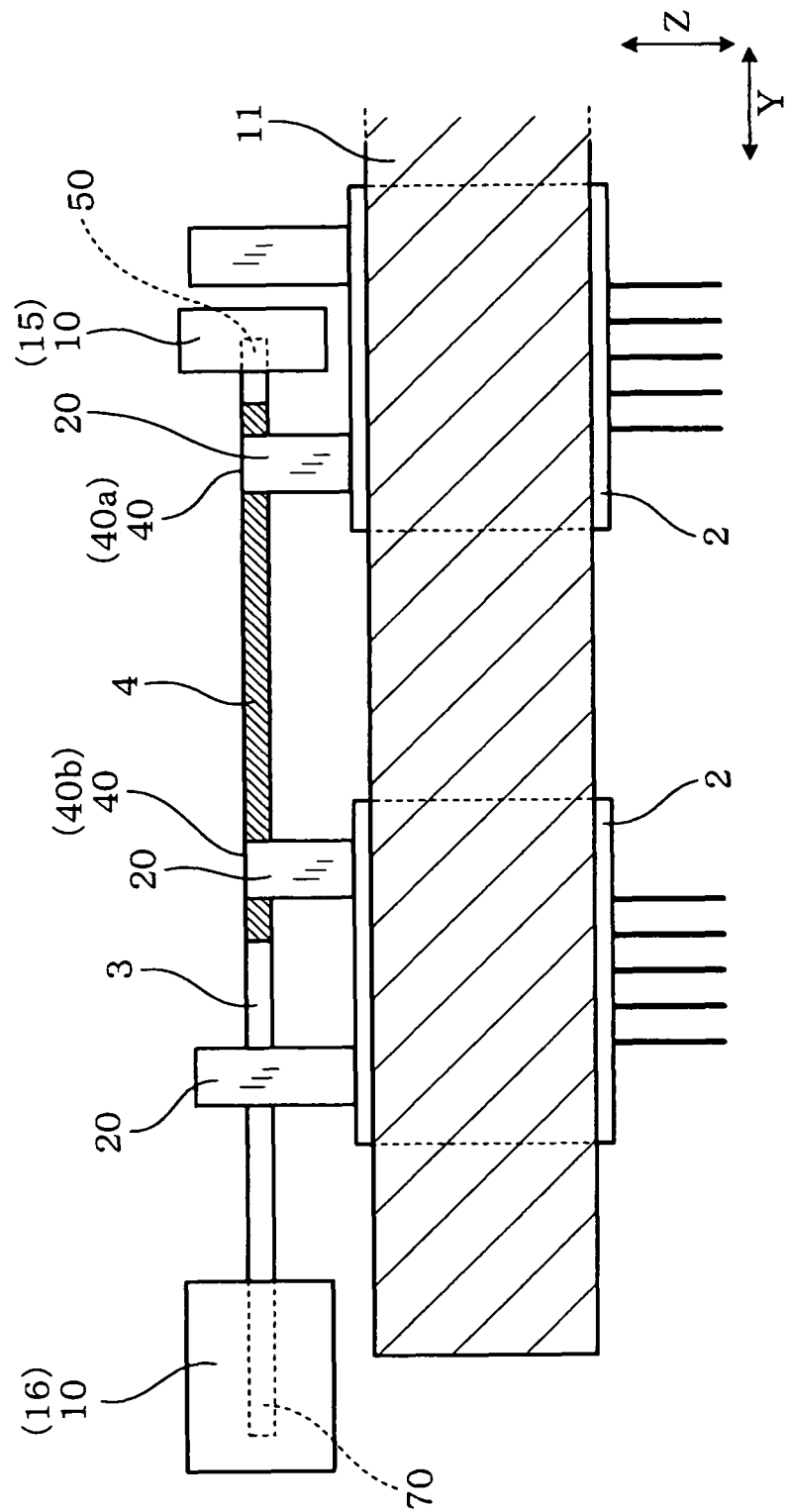
FIG. 17 is a sectional view cut along D-D of FIG. 16.

In the present embodiment, the shape of the bus bar 3 is modified. As shown in FIGS. 16 and 17, the welded plate 4 and the held plate 5 are formed on the same plane orthogonal to the projecting direction (Z direction) of the power terminal 20. The welded plate 4 includes two welded parts 40 (40a, 40c). Parts of the bus bar 3 are sealed with the sealing member 10 and serve as the sealed part 50 and the output side sealed part 70.

As shown in FIG. 16, the slit 6 is formed between the welded part 40 and the held plate 5. The welded plate 4 and the held plate 5 are connected to each other at a predetermined position farther from the sealed part 50 than from one welded part 40a. That is, the welded plate 4 and the held plate 5 are connected to each other at a predetermined position in a state where the distance between the predetermined position and the sealed part 50 is longer than the distance between the predetermined position and one welded part 40a. In addition, the welded plate 4 and the held plate 5 are connected to each other at a predetermined position farther from the output side sealed part 70 than from the other welded part 40b. That is, the welded plate 4 and the held plate 5 are connected to each other at a predetermined position in a state where the distance between the predetermined position and the output side sealed part 70 is longer than the distance between the predetermined position and the other welded part 40b.

The AC terminal 20c of the semiconductor module 2 is located in the slit 6. The AC terminal 20c is welded to the welded plate 4 in a state where a surface of AC terminal 20c and a side face 47 of the welded plate 4 contact each other.

Other configurations are the same as those of the first embodiment.

Advantages of the present embodiment will be explained. In the present embodiment, since the bus bar 3 can be formed without bending the welded plate 4, the manufacturing cost of the bus bar 3 can be reduced. In addition, in the present embodiment, since the welded plate 4 is not bent, the length of the bus bar 3 in the Z direction can be decreased. As a result, the bus bar 3 can be easily miniaturized.

The other same advantages as those of the first embodiment are provided.

Seventh Embodiment

Figure 18:
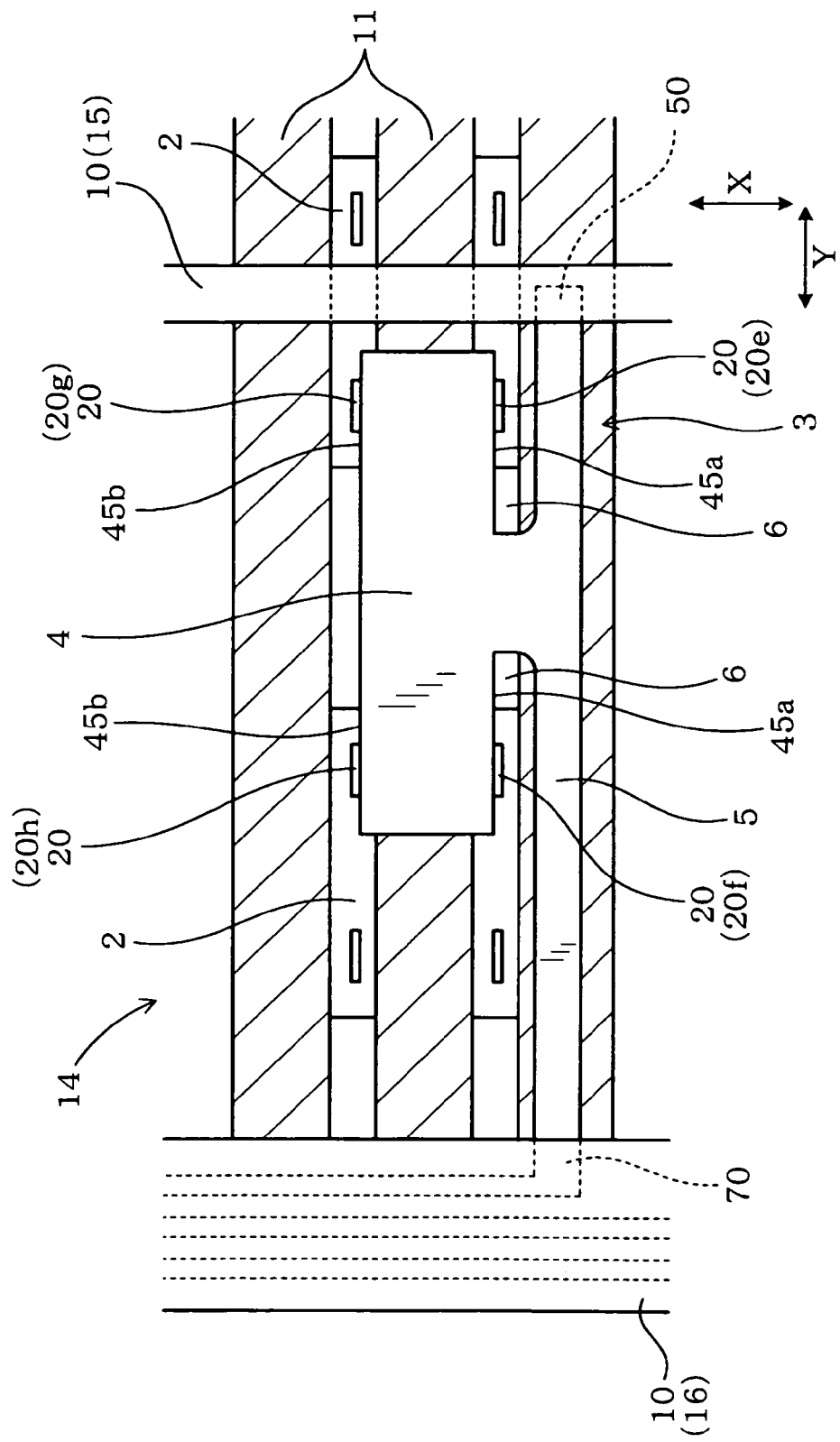
FIG. 18 is an enlarged plan view of a main part of a power conversion apparatus, according to a seventh embodiment.
Figure 19:
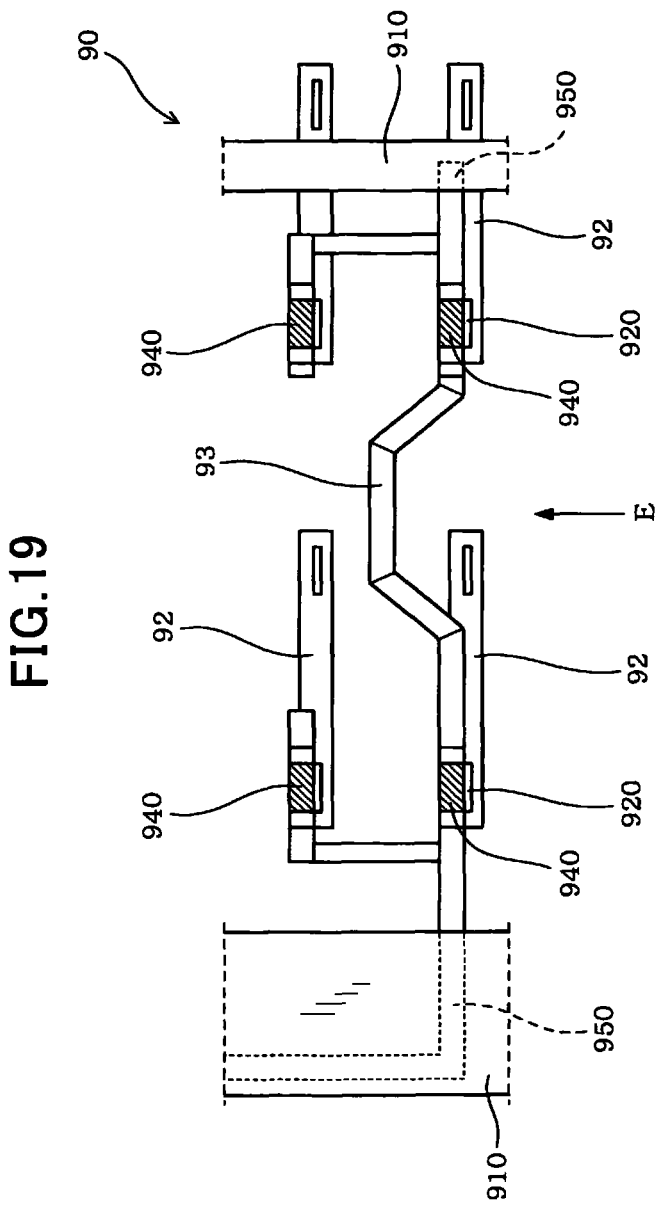
FIG. 19 is a plan view of a bus bar module according to a conventional example.
Figure 20:
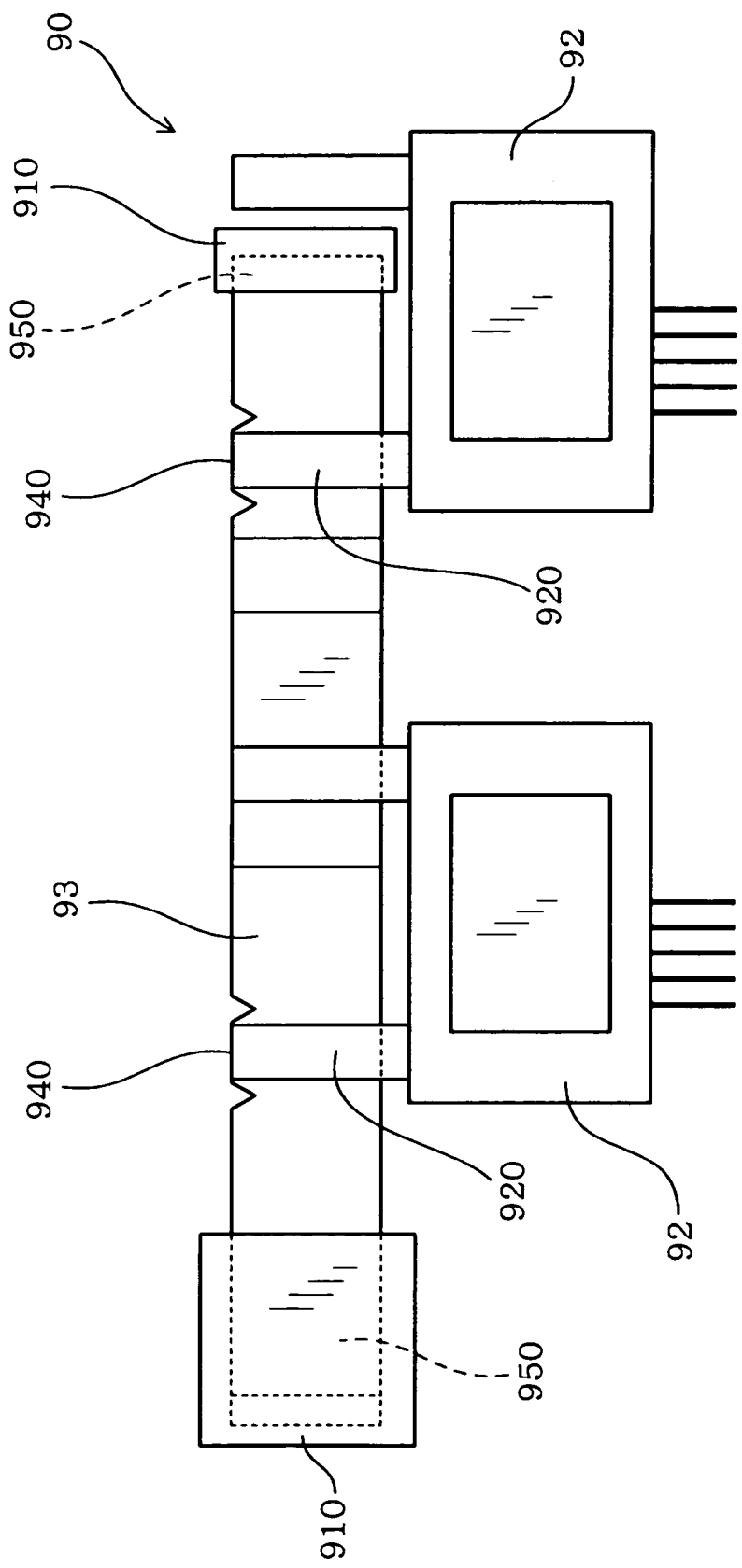
FIG. 20 is a view taken in the direction of arrow E of FIG. 19.
Figure 21:
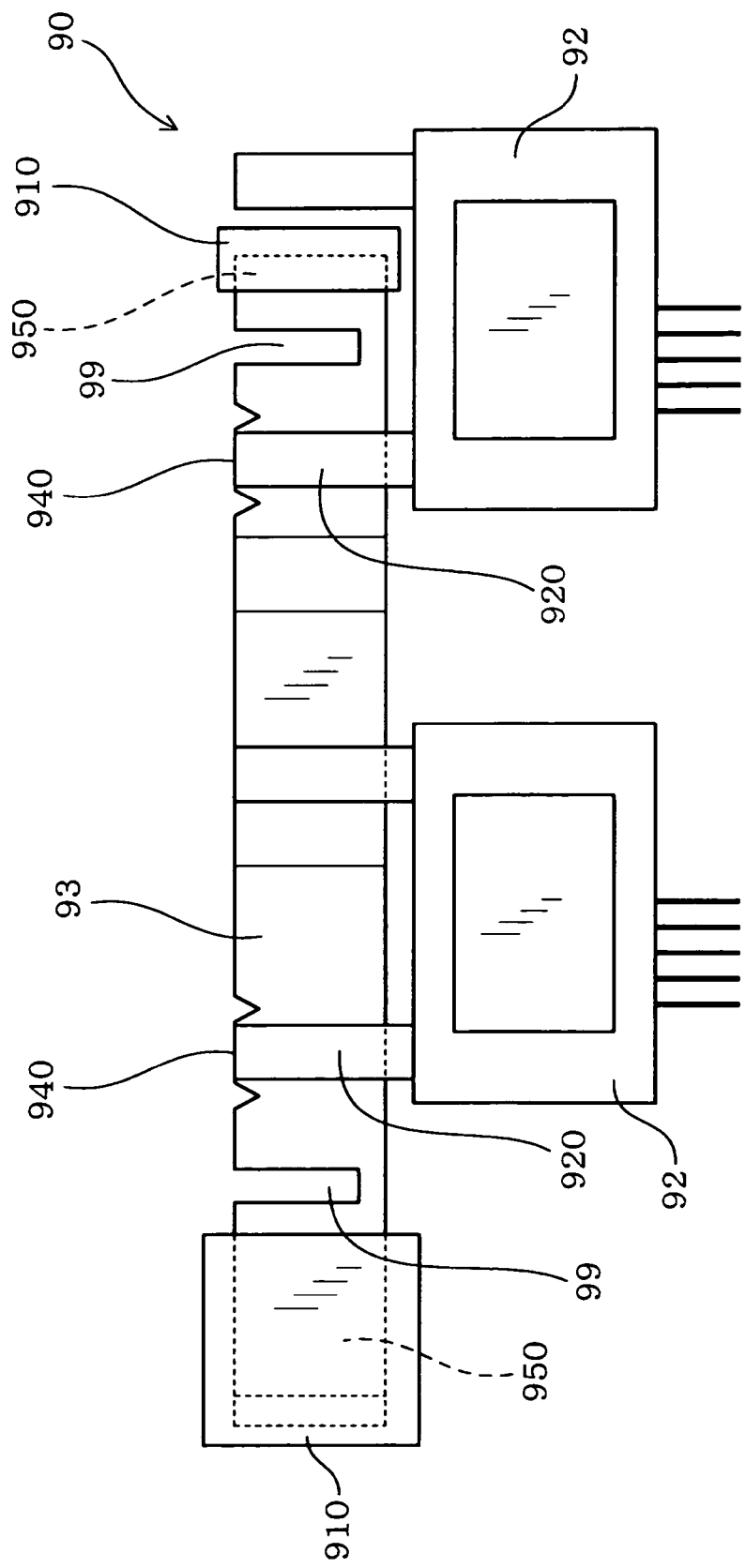
FIG. 21 is a side view of a bus bar module according to a conventional example different from that of FIG. 19.

In the present embodiment, the shape of the bus bar 3 is modified. As shown in FIG. 18, the welded plate 4 is interposed between the power terminals 20 of the two semiconductor modules 2 adjacent to each other in the X direction. That is, the welded plate 4 is interposed between the two power terminals 20e, 20g adjacent to each other in the X direction and between the two power terminals 20f, 20h adjacent to each other in the X direction. In addition, surfaces of the power terminals 20 contact the end faces 45a of one side in the X direction of the welded plate 4 and the end faces 45b of the other side in the X direction of the welded plate 4. The surfaces of the power terminals 20 and the end faces 45a, 45b are welded to each other.

Other configurations are the same as those of the first embodiment.

Advantages of the present embodiment will be explained. In the present embodiment, since the power terminals 20 are welded to both the end faces 45a of one side in the X direction of the welded plate 4 and the end faces 45b of the other side in the X direction of the welded plate 4, a number of power terminals 20 can be connected to one welded plate 4. Hence, the number of the welded plates 4 can be decreased, whereby the shape of the bus bar 3 can be simplified. As a result, the manufacturing cost of the bus bar module 1 can be reduced.

The other same advantages as those of the first embodiment are provided.

Hereinafter, aspects of the above-described embodiments will so be summarized.

As an aspect of the embodiment, the bus bar module, which is electrically connected to a power terminal of an at least one semiconductor module including a semiconductor element, includes: at least one bus bar made of a conductor; and a sealing member made of resin which seals part of the bus bar, wherein the bus bar has at least one welded plate including an at least one welded part welded to the power terminal, and a held plate held by the sealing member, part of the held plate configures a sealed part sealed with the sealing member, at least one slit is formed between the welded plate and the held plate, and the welded plate and the held plate are connected to each other at a predetermined position farther from the sealed part than from the at least one welded part.

The above bus bar module has a bus bar including the welded plate and the held plate. The slit is formed between the welded plate and the held plate. In addition, the welded plate and the held plate are connected to each other at a predetermined position farther from the sealed part than from the welded part.

According to the above configuration, the sealing member around the sealed part does not easily melt. That is, when the power terminal and the bus bar are welded to each other, the heat generated from the welded part is mainly transferred thought the bus bar. However, the heat is first transferred in the direction opposed to the sealed part. Thereafter, the heat is transferred to the held plate and is then moved to the sealed part. Hence, the transfer distance of the welding heat from the welded part to the sealed part can be lengthened. Hence, the welding heat is easily released during conduction, whereby the amount of the welding heat reaching the sealed part can be reduced. As a result, the sealing member around the sealed part can be easily prevented from being melted by the welding heat.

As described above, a bus bar module can be provided in which a sealing member is not easily melted by the heat generated when welding a bus bar.

In the bus bar module, preferably, the held plate is interposed between the two welded plates, the slits are respectively formed between the two welded plates and the held plate, and the two welded plates and the held plate are connected to each other at predetermined positions farther from the sealed part than from the at least one welded part.

In this case, since the bus bar includes the two welded plates, more power terminals can be welded. In this case, the bus bar conducts more current easily. When more current flows through the bus bar, more resistance heat is generated. Hence, the sealing member is especially required to be protected from the resistance heat. Since the bus bar of the present embodiment transfers less heat to the sealed part, as described above, the sealed part can be effectively prevented from melting even when more resistance heat is generated due to the current.

In addition, preferably, the welded plate and the held plate are formed on the same plane orthogonal to the projecting direction of the power terminal, and the power terminal is welded to the welded plate in a state where a surface the power terminal and a side face of the welded plate contact each other.

In this case, since the bus bar can be formed without bending the welded plate, the manufacturing cost of the bus bar can be reduced. In addition, since the welded plate is not bent, the length of the bus bar in the projecting direction of the power terminal can be decreased. As a result, the bus bar can be easily miniaturized.

In addition, preferably, a stacked body is configured by stacking a plurality of the semiconductor modules and a plurality of cooling paths with each other, the cooling paths cooling the semiconductor modules, the welded plate is interposed between the power terminals of the two semiconductor modules adjacent to each other in the stacked direction of the stacked body, and surfaces of the power terminals respectively contact and are welded to an end face of one side in the stacked direction of the welded plate and an end face of the other side in the stacked direction of the welded plate.

In this case, since the power terminals are respectively welded to both the end face of one side in the stacked direction of the welded plate and the end face of the other side in the stacked direction of the welded plate, a number of power terminals can be connected to one welded plate. Hence, the number of the welded plates can be decreased, whereby the shape of the bus bar can be simplified. As a result, the manufacturing cost of the bus bar module can be reduced.

In addition, preferably, a stacked body is configured by stacking a plurality of the semiconductor modules and a plurality of cooling paths with each other, the cooling paths cooling the semiconductor modules, the held plate is interposed between the two welded plates, the two welded plates and the held plate are interposed between the power terminals of the two semiconductor modules adjacent to each other in the stacked direction of the stacked body, and the power terminals are respectively welded to the two welded plates.

In this case, the bus bar can be miniaturized. When the bus bar has two welded plates, the bus bar easily becomes large in size. However, by interposing the two welded plates and the held plate between the two power terminals adjacent to each other in the stacked direction, the total length in the stacked direction of the two welded plates and the held plate can be decreased. Hence, the bus bar can be miniaturized, thereby reducing the amount of the metallic material configuring the bus bar. Thereby, the manufacturing cost of the bus bar can be reduced.

In addition, preferably, the welded plate of each of the bus bars is formed with the one welded part, and part of the sealing member holding the held plate is located between the power terminals projecting from the semiconductor module.

In this case, since each of the welded plates is formed with one welded part, the welded plates can be miniaturized compared with the case in which a plurality of welded parts are formed. In addition, part of the sealing member holding the held plate is located between the plurality of power terminals projecting from the semiconductor module. Hence, the length of the held plate can be decreased. As a result, the bus bar can be miniaturized, whereby the manufacturing cost of the bus bar module can be reduced.

It will be appreciated that the present invention is not limited to the configurations described above, but any and all modifications, variations or equivalents, which may occur to those who are skilled in the art, should be considered to fall within the scope of the present invention.

What is claimed is:

1. A bus bar module, which is electrically connected to a power terminal of an at least one semiconductor module including a semiconductor element, comprising:
   at least one bus bar made of a conductor; and
   a sealing member made of resin which seals part of the bus bar, wherein
   the bus bar has at least one welded plate including an at least one welded part welded to the power terminal, and a held plate held by the sealing member,
   part of the held plate configures a sealed part sealed with the sealing member,
   at least one slit is formed between the welded plate and the held plate,
   the welded plate and the held plate are connected to each other at a predetermined position farther from the sealed part than from the at least one welded part, and
   the power terminal is welded to the welded plate in a state where a surface of the power terminal contacts a side face of the welded plate.

2. The bus bar module according to claim 1, wherein
   the held plate is interposed between the two welded plates,
   the slits are respectively formed between the two welded plates and the held plate, and
   the two welded plates and the held plate are connected to each other at predetermined positions farther from the sealed part than from the at least one welded part.

3. The bus bar module according to claim 1, wherein
   the welded plate and the held plate are formed on the same plane orthogonal to the projecting direction of the power terminal.

4. The bus bar module according to claim 3, wherein
   a stacked body is configured by stacking a plurality of the semiconductor modules and a plurality of cooling paths with each other, the cooling paths cooling the semiconductor modules,
   the welded plate is interposed between the power terminals of the two semiconductor modules adjacent to each other in the stacked direction of the stacked body, and
   surfaces of the power terminals respectively contact and are welded to an end face of one side in the stacked direction of the welded plate and an end face of the other side in the stacked direction of the welded plate.

5. The bus bar module according to claim 1, wherein
   a stacked body is configured by stacking a plurality of the semiconductor modules and a plurality of cooling paths with each other, the cooling paths cooling the semiconductor modules,
   the held plate is interposed between the two welded plates,
   the two welded plates and the held plate are interposed between the power terminals of the two semiconductor modules adjacent to each other in the stacked direction of the stacked body, and
   the power terminals are respectively welded to the two welded plates.

6. The bus bar module according to claim 1, wherein
   the welded plate of each of the bus bars is formed with the one welded part, and
   part of the sealing member holding the held plate is located between the power terminals projecting from the semiconductor module.

* * * * *